(12) United States Patent
Kakuta et al.

(10) Patent No.: US 6,209,861 B1
(45) Date of Patent: Apr. 3, 2001

(54) SHEET TRANSPORT DEVICE AND AUTOMATIC DOCUMENT FEEDER

(75) Inventors: Masayuki Kakuta; Masaki Deguchi; Hiroshi Kobayashi; Jun Kusakabe; Yutaka Aso; Kuniaki Araishi; Shigeo Kurando, all of Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 09/264,701

(22) Filed: Mar. 8, 1999

(30) Foreign Application Priority Data

Mar. 11, 1998 (JP) .................................................. 10-059637
Mar. 17, 1998 (JP) .................................................. 10-066717
Mar. 17, 1998 (JP) .................................................. 10-067291
Mar. 17, 1998 (JP) .................................................. 10-067294

(51) Int. Cl.[7] .................................................. B65H 5/22
(52) U.S. Cl. ..................... 271/3.02; 271/3.08; 271/185; 271/186; 271/240; 271/242; 271/273; 271/4.1; 271/902
(58) Field of Search .................................. 271/273, 3.02, 271/3.04, 3.08, 3.18, 301, 304, 186, 185, 902, 242, 240, 4.1, 265.01; 399/373, 374

(56) References Cited

U.S. PATENT DOCUMENTS 4,456,237 * 6/1984 Buddendeck .......................... 271/186
4,949,134 * 8/1990 Iwaki et al. .......................... 271/240
5,014,972 * 5/1991 Anderson et al. ..................... 271/240
5,449,164 * 9/1995 Quesnel et al. ....................... 271/186
5,887,865 * 3/1999 Ishimaru ............................... 271/186
5,926,681 * 7/1999 Ishimaru ............................... 271/186
5,991,592 * 11/1999 Kobayashi et al. .................. 271/3.14

FOREIGN PATENT DOCUMENTS

402217546 * 8/1992 (JP) ..................................... 271/186

* cited by examiner

Primary Examiner—H. Grant Skaggs
(74) Attorney, Agent, or Firm—Jordan and Hamburg LLP

(57) ABSTRACT

A sheet transport device is provided with a sheet inverting mechanism for retracting a sheet transported along a main transport route into a switchback route to invert the sheet transport direction and returning the sheet into the main transport route to turn the side of the sheet. The sheet transport device has a pair of sheet guides adapted in contact with respective opposite ends of the sheet set on a sheet setting portion to prevent a skew transport of the sheet. The sheet temporarily brought onto the sheet setting portion during a switchback operation from the switchback route is guided between of the sheet guides on the sheet setting portion. During the temporal appearance on the sheet setting portion, the opposite ends of the sheet are aligned by the respective sheet guides. Thereby, securely prevented is an occurrence of a skew transport state of the sheet during the switchback operation.

21 Claims, 16 Drawing Sheets

SHEET TRANSPORT DEVICE AND AUTOMATIC DOCUMENT FEEDER

BACKGROUND OF THE INVENTION

This invention relates to a sheet transport device for use in various image reading/forming apparatuses such as copiers, scanners, facsimiles, and printers for transporting sheets such as documents and copy sheets to a specified image reading/forming position successively to read original document images and/or form an image on the copy sheets, successively.

In the above image forming apparatus such as copiers, a sheet inverting mechanism for turning the side of a document and a copy sheet (hereinafter, also simply referred to as "sheet," as a general term for document and copy sheet,) is required in a document feeder/sheet transport device in order to read an image on the opposite sides of the document or form an image on opposite sides of the copy sheet.

Heretofore, it has been a general practice to adopt a switchback mechanism in the document feeder/sheet transport device wherein the sheet transport direction is inverted in such a manner that the lead end of the sheet in the sheet entering direction into a switchback route becomes the tail end thereof in the sheet exiting direction in order to turn the side of the sheet.

For instance, Japanese Unexamined Patent Publication No. HEI 7-64359 discloses an automatic document feeder for feeding a document to an image reading position for double side image reading. The device of this publication is operated such that: a document is fed from a document tray to the specified image reading position for one side image reading; temporarily discharged onto a document discharge tray after the one side image reading; transported in the opposite direction opposite to the document discharge direction onto the document discharge tray by a switchback mechanism; and then fed to the image reading position again to read an image on the opposite side of the document.

Similar to the above automatic document feeder, there has been known a sheet transport device for use in an image forming apparatus such as copiers, that uses a switchback mechanism to transport a copy sheet to a specified image forming position for double side image formation. In such a sheet transport device provided with the switchback mechanism, similar to the document feeder, the sheet transport direction is inverted by the switchback mechanism after one side image formation to flip over the side of the sheet for the opposite side image formation.

In the switchback mechanism used in the automatic document feeder/sheet transport device, a sheet inverting roller pair for activating a switchback operation is provided near an entrance of a switchback route (the document discharge tray in the prior art device) to invert the sheet transport direction. Specifically, the sheet inverting roller pair is operated such that rotating the sheet inverting roller pair in the forward direction temporarily retracts the sheet into the switchback route from a main transport route, and rotating the sheet inverting roller pair in the reverse direction at a specified timing when the roller pair nips the tail end of the sheet in the entering direction into the switchback route inverts the sheet transport direction to return the sheet from the switchback route to the main transport route.

In the above switchback mechanism, the document discharge tray functioning as the switchback route is not provided with a guide means for correcting a skew discharge of a document. Specifically, the lead end of the document on the way of a switchback operation with respect to the entering direction is left free without the guide means with the result that a skew transport of the document is liable to occur. Thereby, it is highly likely that the document (copy sheet) is transported to the image reading (forming) position in a skew transport state, resulting in a poor image reading (formation) such that an image is read (formed) in the skew transport state.

SUMMARY OF THE INVENTION

In view thereof, it is an object of the present invention to provide a sheet transport device that securely prevents a skew transport of a sheet during a switchback operation thereof.

To fulfill the above object, a sheet transport device, according to an aspect of the invention comprises: a sheet setting portion for setting a sheet; a pair of sheet guides adapted in contact with respective lateral opposite ends of the sheet set on the sheet setting portion to prevent a skew transport of the sheet; a main transport route for transporting the sheet in a sheet transport direction from the sheet setting portion to an image reading position to enable an image reading of the sheet or an image forming position to enable an image formation on the sheet; a switchback route intersecting at a specified position of the main transport route and extending upward therefrom to guide a lead end of the sheet between the pair of sheet guides; and a switchback mechanism for guiding the sheet from the main transport route into the switchback route and returning the sheet into the main transport route by inverting a tail end and a lead end of the sheet along the sheet transport direction.

In the above arrangement, the sheet entering the switchback route for the switchback operation is guided inward of the pair of sheet guides provided on the sheet setting portion from the switchback route. The inward guiding of the sheet by the pair of sheet guides securely prevents a skew transport state of the sheet during the switchback operation.

These and other objects, features and advantages of the present invention will become more apparent upon reading of the following detailed description and accompanying drawings.

DETAILED DESCRIPTION OF THE INVENTION

An automatic document feeder for use in a copier is described as an embodiment of a sheet transport device according to this invention.

It should be noted that the present invention is not limited to an automatic document feeder for successively feeding a set of documents for image reading, but is also applicable to a sheet transport device provided with a switchback mechanism, e.g., a sheet transport device for use in image forming apparatuses such as copiers, printers, and facsimiles for forming an image on a copy sheet.

Figure 1A:
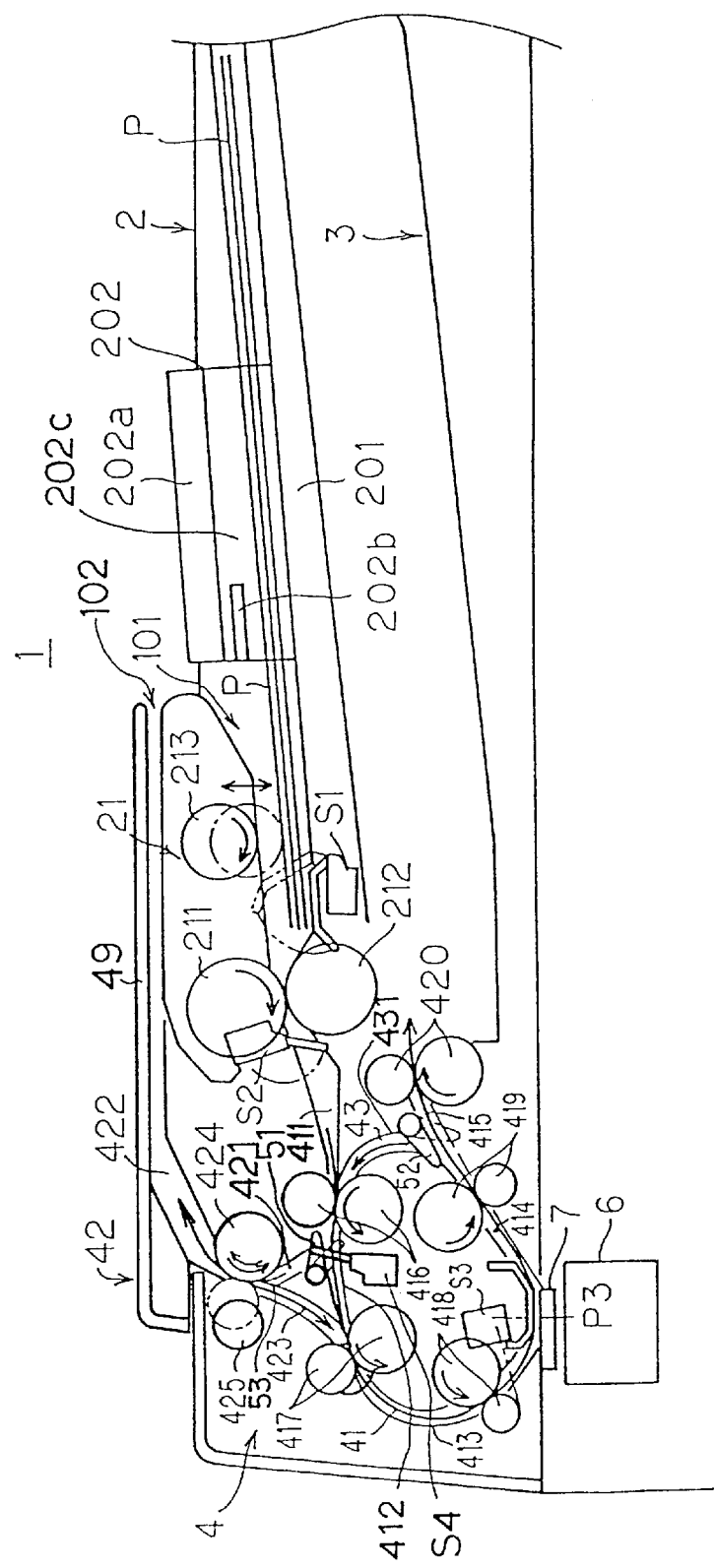
FIG. 1A is a schematic diagram showing essential parts of an automatic document feeder embodying the present invention.
Figure 1B:
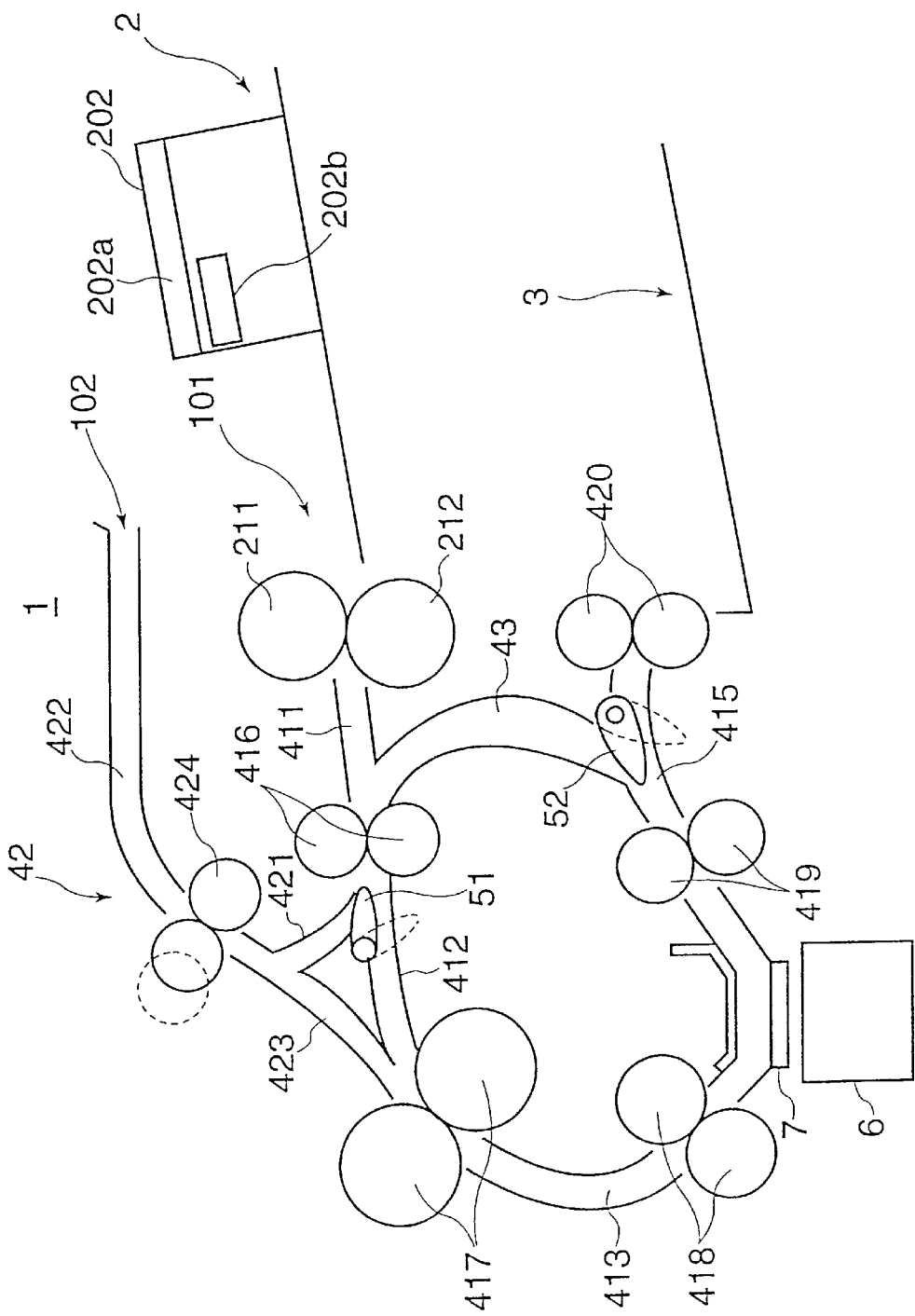
FIG. 1B is an enlarged view of the essential part of the automatic document feeder shown in FIG. 1A.

FIG. 1 is a diagram showing essential parts of an automatic document feeder embodying this invention.

In FIG. 1, the automatic document feeder 1 includes a document setting portion 2 for setting a set of documents and a document discharge portion 3 for discharging the document set after image reading. The document setting portion 2 and the document discharge portion 3 are set in a vertically spaced relation. A document transport unit 4 for transporting a document for image reading is provided at a front end (left side in FIG. 1) of the document setting portion 2 and the document discharge portion 3.

The document transport unit 4 includes a U-shape transport section 41 (or main transport route) for transporting a document from the document setting portion 2 up to the document discharge portion 3 substantially along a U-shape track for one side image reading/single side image reading, a switchback section 42 for inverting the sheet transport direction by a switchback operation for double side image reading, and a feedback section 43 for returning a document after one side image reading toward the switchback section 42 for turning the side of the document (for the opposite side image reading).

The automatic document feeder 1 is operated such that combining the U-shape transport section 41, the switchback section 42, and the feedback section 43 according to needs enables double side image reading (hereinafter, simply referred to as "DS image reading") as well as single side image reading (hereinafter, simply referred to as "SS image reading").

The automatic document feeder 1 (hereinafter, also referred to as "ADF 1") adopts a system in which a set of documents stacked on the document setting portion 2 are automatically fed one by one from the uppermost one (hereinafter, referred to as "up-to-down-feed-in system").

Figure 2:
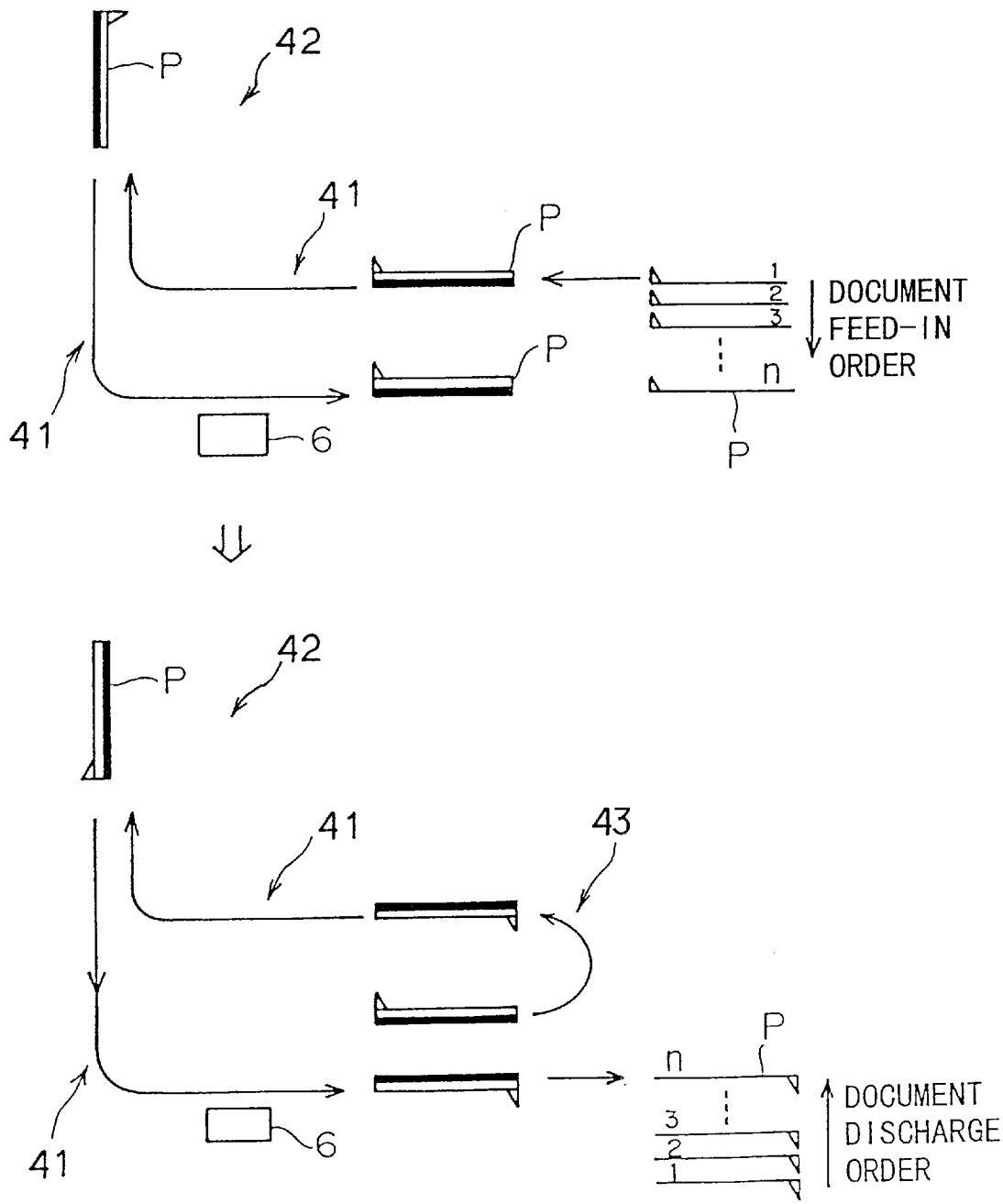
FIG. 2 is a diagram showing a transport control of a set of documents when the documents, stacked in a manner that the page number increases as going down, are successively fed from the uppermost one for double side image reading.

FIG. 2 is a diagram schematically showing a procedure of feeding a document for DS image reading by the ADF 1. In FIG. 2, the side of the bold straight line of the document P corresponds to the opposite side (even number page) of the document P, and the side carrying the mark Δ corresponds to one side (odd number page) of the document P. In this embodiment, a set of documents are stacked on the document setting portion 2 in a state that the first sheet $P_1$ is placed at the uppermost position, and the last sheet $P_n$ is placed at the lowermost position, as shown in FIG. 2, and are fed according to up-to-down-feed-in system.

Referring to FIG. 2, the ADF 1 is operated such that the uppermost document $P_1$ on the document setting portion 2 is fed to the switchback section 42 for turning the side of the document $P_1$ and transported to an image reader unit 6 to read image data on the opposite side of the document $P_1$. The document $P_1$, after the opposite side image reading, is fed to the switchback section 42 again via the feedback section 43. In the switchback section 42, the transport direction of the document $P_1$ is inverted and transported to the image reader unit 6 to read image data on one side of the document $P_1$. After the one side image reading, the document $P_1$ is discharged onto the document discharge portion 3 in a state that the one side thereof faces downward. In this way, the set of documents P are transported according to the above procedure one after another for DS image reading and discharged onto the document discharge portion 3 in a state that the page order is identical to the initially stacked state on the document setting portion 2 except that the document $P_1$ is placed at the lowermost position and the document $P_n$ is placed at the uppermost position on the document discharge portion 3.

In the case of SS image reading, a set of documents P are transported along the U-shape transport section 41 and discharged onto the document discharge portion 3 in the same page order as set on the document setting portion 2 except that the one side of the documents faces downward on the document discharge portion 3 while facing upward on the document setting portion 2. Accordingly, similar to the DS image reading, the set of documents P are discharged onto the document discharge portion 3 in the same page order as stacked on the document setting portion 2 after the SS image reading.

Referring back to FIG. 1, the arrangement of various parts constituting the ADF 1 is described in the following section.

Figure 3:
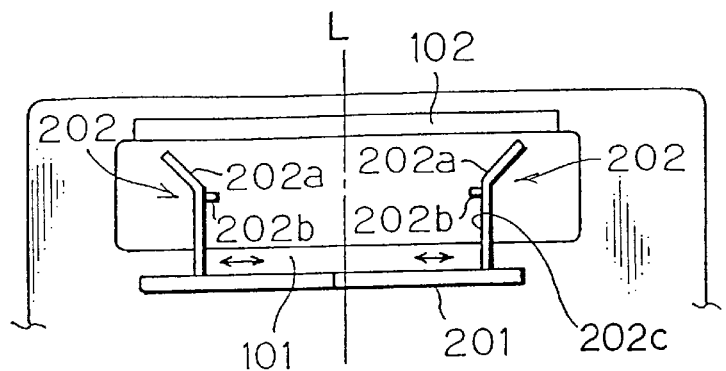
FIG. 3 is a rear view of a document setting portion viewed from rearward of the document feeder.
Figure 4:
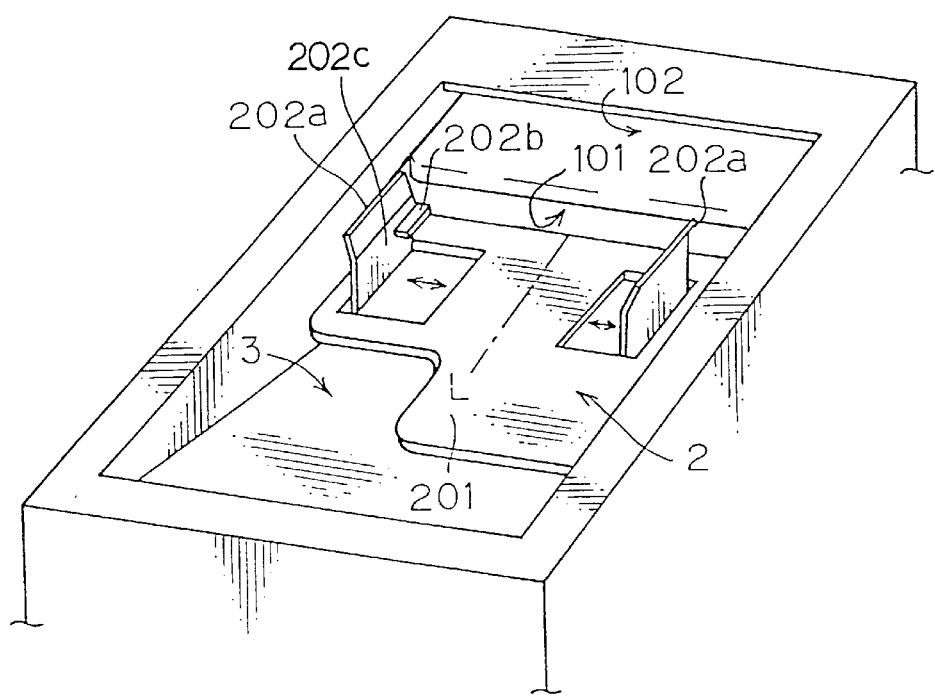
FIG. 4 is a perspective view of essential parts of the document setting portion including a pair of document guides.

The document setting portion 2 includes a document tray 201 made of a resin. The document tray 201 is detachably mounted on a main body of the ADF 1 through a hollow portion (including a document feed-in port 101 and an invert access port 102, see FIG. 4) in a state that a tail end thereof in the document feed-in direction (right side in FIG. 1) is tilted upward. A pair of document guides (or sheet guides) 202 are set in an upright posture at a bottom surface of the document tray 201. The document guides 202 are adapted for preventing a skew transport of the document during a switchback operation on the document tray 201 when feeding the document in and out through the invert access port 102 (see FIG. 4) while aligning the width of the document on the document tray 201, which is described below in detail. As shown in FIGS. 3 and 4, the pair of document guides 202 are set slidable toward and away from each other in a symmetrical relation relative to a center line L on the document tray 201 to adjust the distance therebetween in accordance with various sizes of document.

Each of the document guides 202 has a rectangular plate-like shape and. is formed with a tapered portion 202a at an upper end thereof. The tapered portion 202a is bent outward at such an angle that the distance between the document guides 202 increases as directing toward the tip thereof. The tapered portion 202a is adapted for guiding a lead end of the document P temporarily discharged on the document tray 201 through the invert access port 102 during a switchback operation, inward of the opposing document guides 202 above the remaining set of documents P stacked on the document setting portion 2, which is described below.

Guiding the document P temporarily discharged on the document tray 201 during the switchback operation inward of the pair of document guides 202 enables correcting a skew feed-out (discharge) operation of the document P onto the document tray 201 as well as a skew feed-in operation of the document P into the switchback section 42 while aligning the width of the document P by the document guides 202.

Specifically, in the embodiment, the document guides 202 function as a guide means for correcting a skew feed-in/ feed-out operation of the document P onto the document setting portion 2 during the switchback operation, as well as a guide means for preventing a skew feed-in operation of the document P set on the document setting portion 2. This arrangement eliminates providing an additional member (guide means) for correcting a skew transport of the document P during the switchback operation. Accordingly, the number of guide means projecting upward from the upper surface of the ADF 1 for correcting a skew transport is reduced to avoid an undesired state that the protruding guide means would impair the external appearance of the apparatus (e.g., copier) as a whole.

Sliding the opposing document guides 202 toward and away from each other to adjust the distance therebetween in accordance with the size of the document P when the document P is set on the document setting portion 2 automatically secures the distance between the document guides 202 suitable for preventing a skew feed-in/feed-out operation during the switchback operation, as well as aligning the width of the document P to be fed into the document feed-in port 101. Thereby, the operability of the device (copier) is improved.

Figure 5:
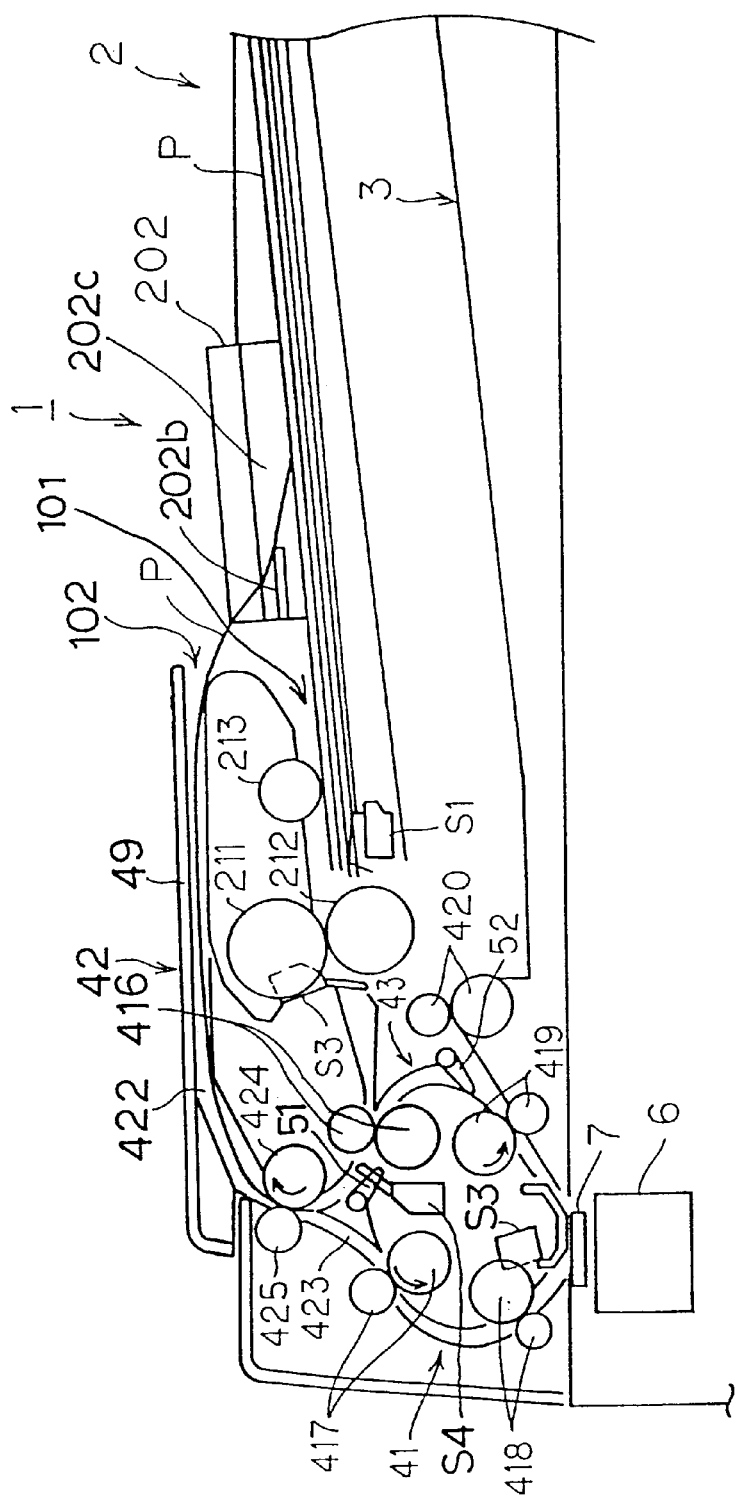
FIG. 5 is a schematic diagram of the document feeder showing a state that a document is being temporarily discharged on the document setting portion during a switchback operation thereof.

Projecting pieces 202b in the bar shape (see FIGS. 3 and 4) are provided on an inner surface at a front side of the respective document guides 202. The projecting pieces 202b, as shown in FIG. 5, securely support the document P from the bottom on the way of switchback operation to keep the lead end of the document P sufficiently away from the document feed-in port 101 on the document tray 201.

Projecting pieces 202b function as a partition that divides a lower sheet transport path between the document tray 201 and the document feed-in port 101 and an upper sheet transport path between the document tray 201 and the invert access port 102 so that the two paths do not interfere with each other.

Securely supporting the document P on the way of switchback operation by the projecting pieces 202b in vertically spaced relation from the document feed-in port 101 prevents a possibility that the lead end of the document P coming onto the document tray 201 (rightward direction in FIG. 5) during the switchback operation droops downward, curls into the document feed-in port 101 and is stuck therein, which may cause a jam of the document P. Also, this arrangement prevents a possibility that the remaining set of documents stacked on the document setting portion 2 may interfere with the feed-in/feed-out operation of the document P under the switchback operation.

The projecting piece 202b functions as a restricting means for preventing droop of the document P on the way of the switchback operation onto the document tray 201. The restricting means may have any shape besides the bar-shape, as far as it accomplishes the function as the restricting means. Further, the projecting piece 202b may be set at any height level as long as it accomplishes the function as the restricting means. Also, the projecting pieces 202b may function as a document number determinator for determining the maximum number of documents settable on the document tray 201 by setting the projecting pieces 202b at such a height level.

A skew correction of the document P on the way of switchback operation and countermeasures for preventing an interference of the switchback operation of the document P by the remaining set of documents are described below in detail combined with operations of the ADF 1.

Referring back to FIG. 1, a sheet separator/feeder unit 21 is provided at the lead end of the document setting portion 2 in the document feed-in direction. The sheet separator/ feeder unit 21 includes a document sensor S1, a feed roller 211, a separation roller 212, and a forward roller 213.

The document sensor S1 detects the presence or absence of document P on the document tray 201, and is provided at a bottom portion at the lead end of the document tray 201. The forward roller 213 is adapted for feeding the document P (uppermost document) in contact therewith in the forward direction utilizing a frictional force between the forward roller 213 and the document P, and is provided at an upper position at the lead end of the document tray 201. The forward roller 213 is selectively seftable at an upper position and a lower position by a sheet feed solenoid (not shown). The feed roller 211 and the separation roller (driven roller) 212 feed the uppermost document P in contact with the forward roller 213 forward toward the document trans port unit 4 by driving the feed roller 211. The feed roller 211 and the separation roller 212 are provided at the lead end of the document tray 201.

The feed roller 211 and the forward roller 213 are designed to rotate in clockwise direction in FIG. 1 in such a manner that a rotating drive force of a feed motor (not shown) is transmitted to the feed roller 211 and the forward roller 213 via a feed clutch (not shown) to feed the uppermost document P on the document tray 201 toward the document transport unit 4. The separation roller 212 is rendered in sliding contact state with the feed roller 211 and is driven followed by the rotation of the feed roller 211 while causing a rotational friction between the feed roller 211 and the separation roller 212. Due to the frictional contact, the uppermost document P on the document tray 201 is separated from the remaining set of documents and fed forward toward the document transport unit 4.

The document transport unit 4 includes the U-shape transport section 41 consisting of a first transport route 411, a second transport route 412, a third transport route 413, a fourth transport route 414, and a fifth transport route 415 which jointly form a substantially U-shape, a feed sensor S2, a timing sensor S3, a pair of registration rollers 416, an upper transport roller pair 417, a lower transport roller pair 418, an intermediate roller pair 419, and a discharge roller pair 420. The U-shape transport section 41 consisting of the first to fifth transport routes 411 to 415 constitutes a main transport route of the document feeder according to this invention.

The first transport route 411 and the second transport route 412 extend downstream of the feed roller 211 and the separation roller 212 substantially in a straight shape. The third transport route 413 is curved into C-shape and extends downward from the exit of the second transport route 412. The fourth transport route 414 is so constructed as to extend from the exit of the third transport route 413 and pass an image reading position P3 located below the second transport route 412. The fifth transport route 415 extends from the exit of the fourth transport route 414 toward the document discharge portion 3.

A plurality of roller pairs for transporting the document P according to the transport procedure of the ADF 1 are provided at respective junctions of the first to fifth transport routes 411 to 415. Specifically, the registration roller pair 416 is provided at the junction between the first transport route 411 and the second transport route 412, the upper transport roller pair 417 is provided at the junction between the second transport route 412 and the third transport route 413, the lower transport roller pair 418 is provided at the junction between the third transport route 413 and the fourth transport route 414, and the intermediate roller pair 419 is provided at the junction between the fourth transport route 414 and the fifth transport route 415. The discharge roller pair 420 is provided at the exit of the fifth transport route 415.

The feed sensor S2 is provided at a base end of the first transport route 411 to control operation timings of various parts by detecting the position of the document being transported inside the ADF 1. The timing sensor S3 is provided at a base end of the fourth transport route 414.

The feed sensor S2 detects whether the document P is fed out from the document setting portion 2. A detection signal outputted from the feed sensor S2 is used to control drive start timing of the registration roller pair 416.

The registration roller pair 416 is adapted for correcting a skew transport of the document P fed out from the document setting portion 2, and is driven in such a direction as to transport the document P downstream by drive of the feed motor via a registration clutch (not shown).

The upper transport roller pair 417 and the lower transport roller pair 418 are driven in such a direction as to transport the document P to the image reading position P3. The upper transport roller pair 417 and the lower transport roller pair 418 are designed to rotate in such a direction as to transport the document P downstream by operation of a transport motor (not shown).

The intermediate roller pair 419 is designed to changeably discharge the document P to the document discharge portion 3 or return the document P into the first transport route 411 via the feedback section 43, and is driven in such a direction as to transport the document P downstream by operation of the transport motor.

The discharge roller pair 420 discharges the document P after the image reading onto the document discharge portion 3, and is designed to rotate in such a direction as to discharge the document P onto the document discharge portion 3 by operation of the transport motor.

The upper transport roller pair 417 functions as a registration roller pair (corrector for correcting a skew transport of the document P after a switchback operation) for correcting a skew transport of the document P by driving the upper transport roller pair 417 at a certain timing, which is described below, when the document P exits from the switchback section 42 after the switchback operation.

The lower transport roller pair 418 is provided at such a position as to nip the document P near a transport plane constituting the third transport route 413, on the side where a driven roller 418*b* of the lower transport roller pair 418 is provided, so as to prevent occurrence of a document jam around the lower transport roller pair 418.

Hereinafter, the location of the lower transport roller pair 418 is described with reference to FIGS. 6 to 11.

Figure 6:
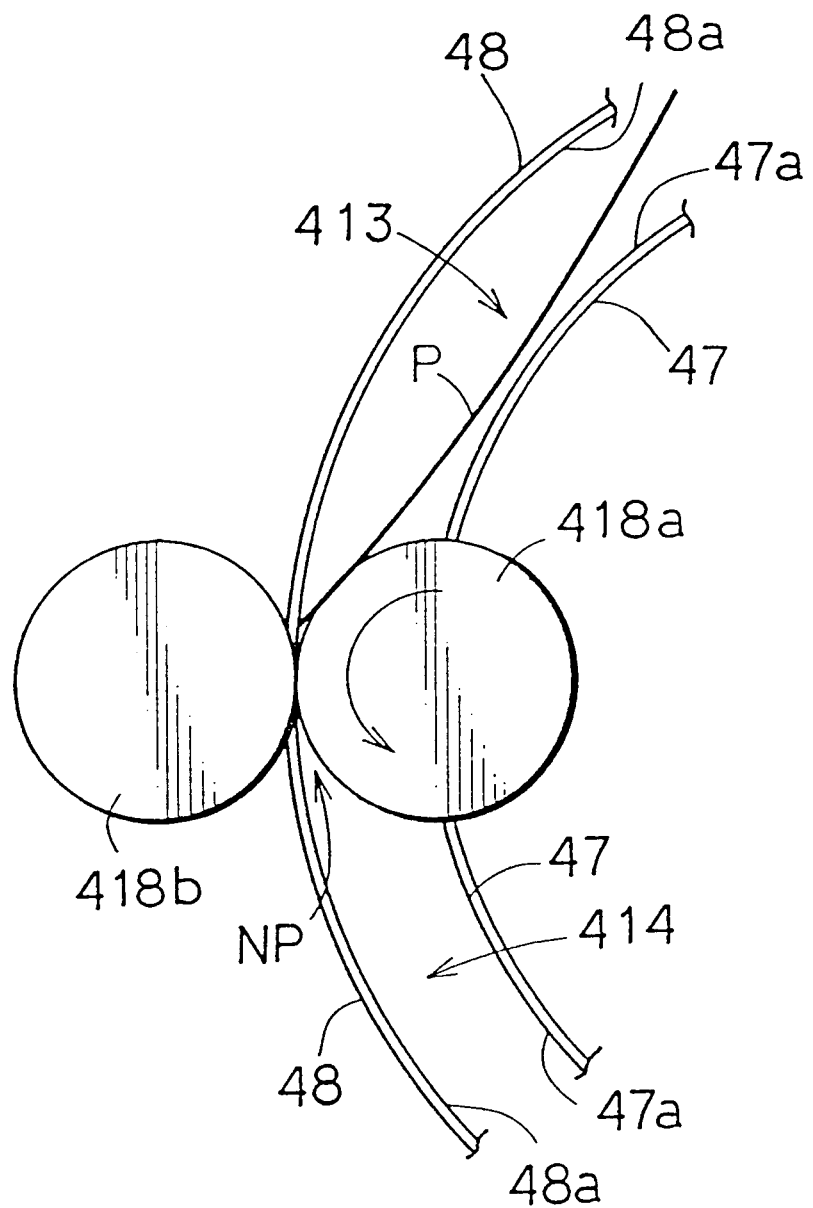
FIG. 6 is an enlarged side view of a lower transport roller pair and peripheral parts thereof in the document feeder.
Figure 7:
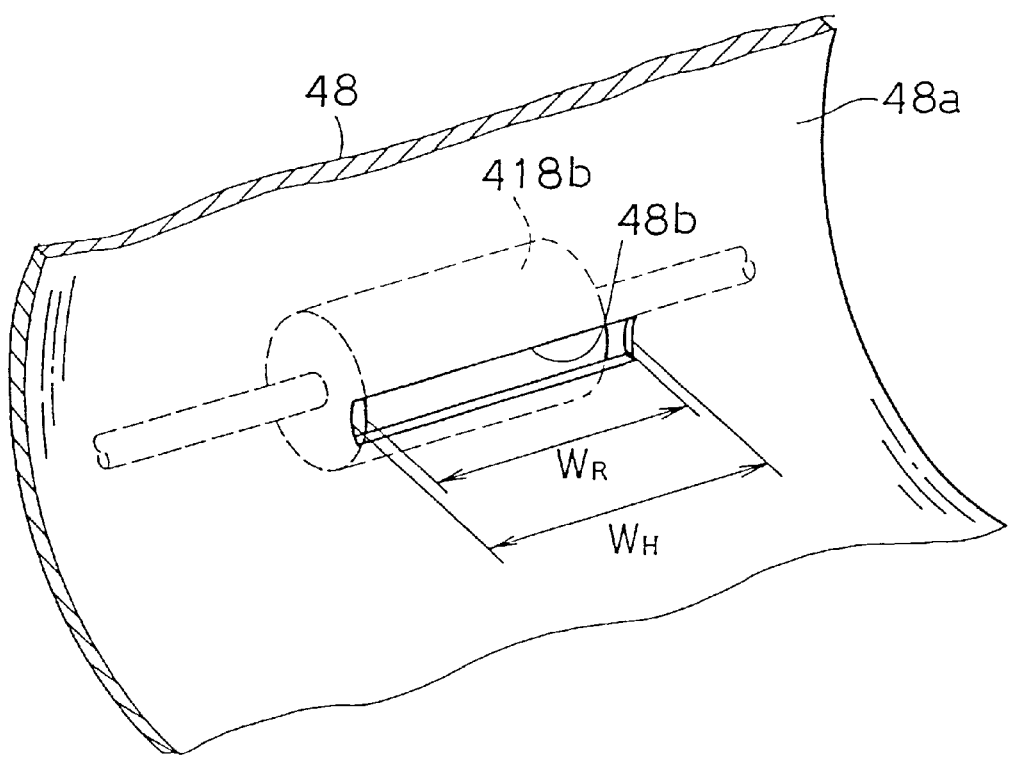
FIG. 7 is a perspective view of a driven roller of the lower transport roller viewed from the side of a drive roller (drive roller is omitted)
Figure 8:
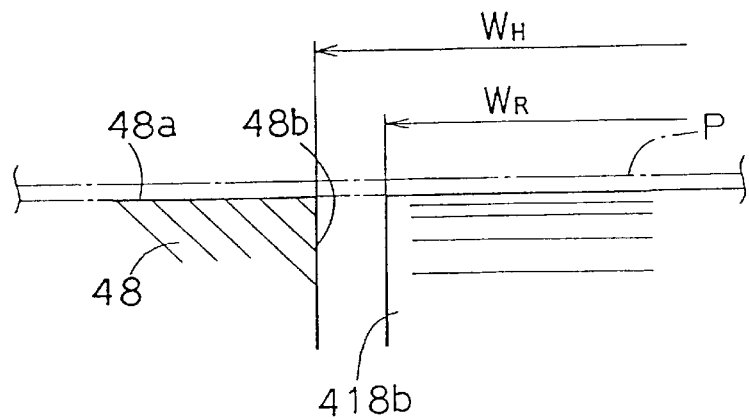
FIG. 8 is an enlarged cross-sectional view of a boundary area between the driven roller of the lower transport roller pair and a transport plane for transporting the document in the document feeder.
Figure 9:
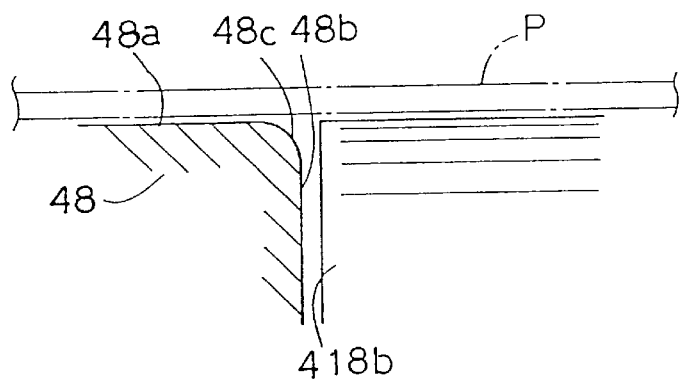
FIG. 9 is an enlarged cross-sectional view of the boundary area between the driven roller of the lower transport roller pair and the transport plane for transporting the document in the document feeder as an altered arrangement.
Figure 10:
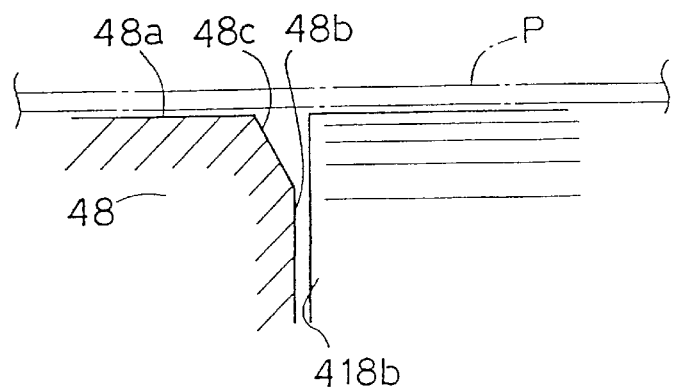
FIG. 10 is an enlarged cross-sectional view of the boundary area between the driven roller of the lower transport roller pair and the transport plane for transporting the document in the document feeder as another altered arrangement.
Figure 11:
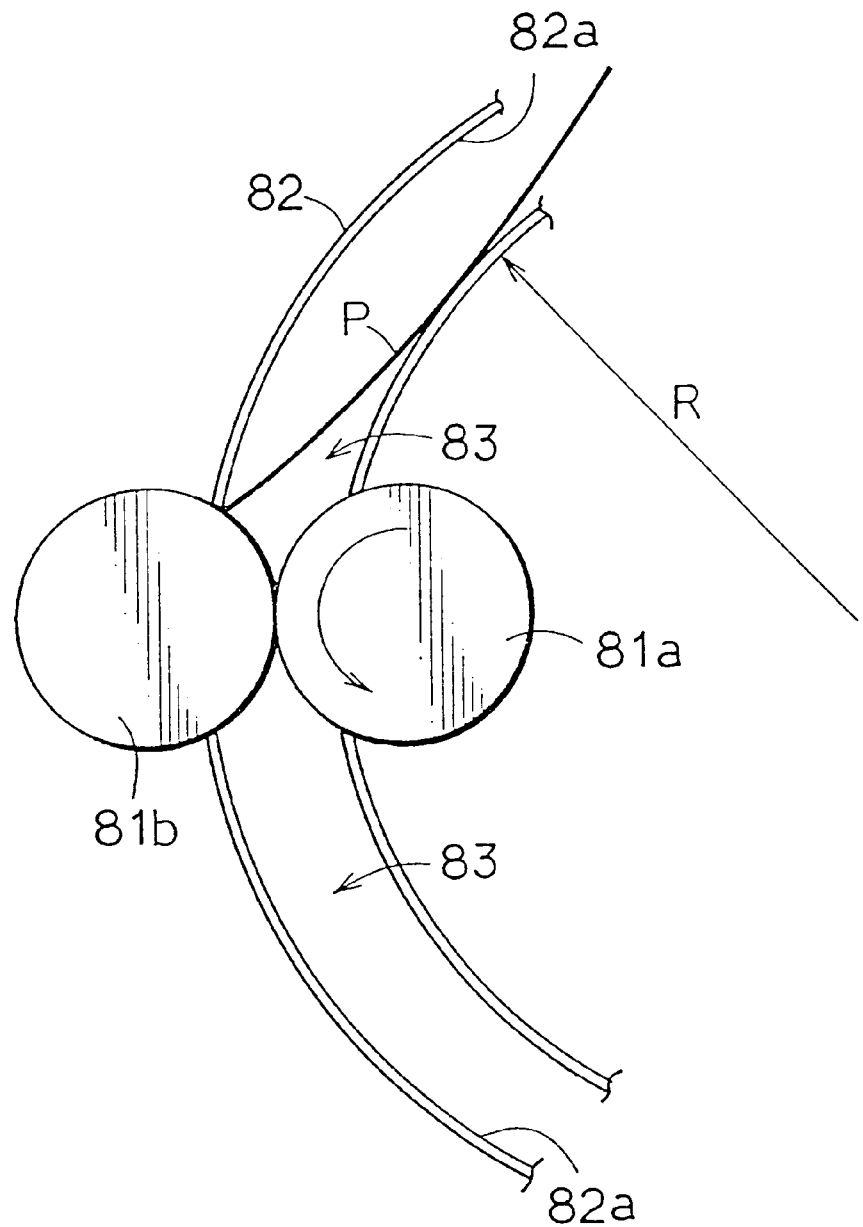
FIG. 11 is a cross-sectional side view of a roller pair and peripheral parts thereof in a conventional device.

FIG. 6 is an enlarged side view of the lower transport roller pair 418 consisting of a drive roller 418*a* and the driven roller 418*b* and the vicinity thereof, FIG. 7 is a perspective view of the driven roller 418*b* viewed from the side of the drive roller 418*a* (drive roller 418*a* is omitted in FIG. 7), FIGS. 8 to 10 are enlarged cross-sectional views of a boundary area between the driven roller 418*b* and the transport plane 48*a* on the side of the driven roller 418*b*, and FIG. 11 is a cross-sectional side view showing an example of the arrangement of a conventional roller pair.

As shown in FIG. 6, the drive roller 418*a* of the lower transport roller pair 418 is constructed such that a part of the drive roller 418*a* projects inward of the third transport route 413 and the fourth transport route 414 from a transport plane 47*a* of a guide plate constituting the third transport route 413 and the fourth transport route 414. On the other hand, the driven roller 418*b* is constructed such that a part of the outer circumference thereof is set substantially on the same plane as the transport plane 48*a* of the guide plate 48 constituting the third transport route 413 and the fourth transport route 414. In this arrangement, a nip portion NP defined by the drive roller 418*a* and the driven roller 418*b* for nipping the document P is located on the transport plane 48*a*.

The above arrangement of the lower transport roller pair 418 is adopted in this embodiment for the following reason. If a transport roller pair consisting of a drive roller 81*a* and a driven roller 81*b*, as shown in prior art arrangement of FIG. 11, is arranged in such a manner that the driven roller 81*b* bulges inwardly into a transport route 83 from a transport plane 82*a* on the side of the driven roller 81*b*, it is difficult to nip a sheet or a document having less flexibility (e.g., rigid copy sheet) or a sheet or a document with a lead end curled toward the side of the driven roller 81*b* (e.g., an outwardly curled sheet P shown in FIG. 11) between the drive roller 81*a* and the driven roller 81*b* due to abutment of the lead end of the sheet P against a boundary portion between the drive roller 81*a* and the driven roller 81*b*, which may likely lead to a sheet transport failure or a sheet transport jam. The less the curvature of radius R of the transport route 83 is, the more the above drawback is likely to happen.

In the case where the drive roller 81*a* and the driven roller 81*b* function as a registration roller pair, it is highly likely that the lead end of the sheet P is abutted against the boundary portion due to the property (state) of the surface of the driven roller 81*b* which is made of a slippery material such as polyacetal (POM) and metal. Accordingly, there rises a high risk of occurrence of jam.

In this embodiment, the above arrangement is adopted to solve the above problem. The above arrangement is advantageous in the following point. Even if a document with less flexibility or a document with a lead end thereof curled greatly toward the driven roller 418b (e.g., an outwardly curled document P in FIG. 6) is transported toward the lower transport roller pair 418, the document P is securely guided along the nip portion NP set at the substantially same plane as the transport plane 48a. Thereby, the document P is securely and smoothly transported toward the image reading position P3.

In this embodiment, the nip portion NP is set at the substantially same plane as the transport plane 48a on the side of the driven roller 48b. Alternatively, the nip portion NP may be set inward of the third transport route 413 and the fourth transport route 414. As far as the nip portion NP is set in the vicinity of the transport plane 48a, the same effect as mentioned in the embodiment is obtainable.

Specifically, as a result of various experiments conducted by the applicant of this application, the following was confirmed. In the case of transporting a sheet of plain paper copy (PPC) or its equivalent, it was confirmed that the above effect is obtained as far as the bulging amount of the driven roller 418b projecting inward the third transport route 413 and the fourth transport route 414 is set within the range of 0 to 0.8 mm from the transport plane 48a. In other words, when the nip portion NP between the drive roller 418a and the driven roller 418b is set flush with or in the vicinity of the transport plane 48a, a sheet with less flexibility or with a curled lead end as well as PPC sheet is securely nipped between the lower transport roller pair 418 and smoothly transported along the third transport route 413 and the fourth transport route 414.

In order to transport the document P in contact with the nipped portion NP along the transport plane 48a, it is necessary to form an opening 48b in the transport plane 48a of the guide plate 48 for exposing part of the driven roller 418b corresponding to the nip portion NP inward of the third transport route 413 and the fourth transport route 414. When forming the opening 48b, it is essential to set the relation between the width WH of the opening 48b in the rotating axial direction of the driven roller 418b (in the width direction of the document P) and the width WR of the driven roller 418b in the axial direction thereof at a proper value.

The reason for setting the relation is as follows. It has been a common practice to set the width WH of the opening 48b equal to or slightly wider than the width of the driven roller 418b. According to this conventional arrangement, it is likely that a wrinkle or a shriveling portion is formed on a boundary portion of a sheet between a nipped portion and an un-nipped portion during transport thereof due to the following reason. In case that the clearance is set small and the projection amount of the driven roller 418b inward to the transport route is almost none, it is likely that the boundary portion of the sheet is pressed hard against the lateral edge of the opening.

To solve the above problem, in this embodiment, as shown in FIGS. 7 and 8, the width WH of the opening 48b is set sufficiently larger than the width WR of the driven roller 418b such that, e.g., the clearance between one axial end of the driven roller 418b and the corresponding rim of the opening 48b in the axial direction of the driven roller 418b is set as wide as 2 to 3 mm.

As an altered arrangement, an end portion 48c of the opening 48b opposing to the driven roller 418b is shaped into a curve (i.e., a sharp edge is rounded off), as shown in FIG. 9, such that the width WH of the opening 48b increases as directing inward of the third transport route 413 and the fourth transport route 414 in the length direction (axial direction) of the driven roller 418b. Further, the end portion 48c may be shaped into a taper as shown in FIG. 10. The se arrangement make it possible to more reliably solve the above problem.

In this embodiment, the above arrangement for preventing jam of the document P was described taking the example of the lower transport roller pair 418 in the ADF 1. However, since the ADF 1 is provided with a plurality of transport roller pairs for transporting the document P while nipping the document P therebetween having the same mechanism as the lower transport roller pair 418, it is clear that the above arrangement is applicable to any roller pair such as the registration roller pair 416 and the upper transport roller pair 417 and the same effect as mentioned in the embodiment is obtained.

In the embodiment, the above arrangement was described for the lower transport roller pair 418 provided on the curved third and fourth transport routes 413, 414. It is true to say that the same effect as mentioned in the embodiment is obtained for the roller pair provided on a straight transport route.

Referring back to FIG. 1, a contact glass 7 is provided underneath the image reading position P3 of the fourth transport route 414. The image reader unit 6, provided with an image pick-up sensor such as a CCD line sensor, is provided below the contact glass 7. In the image reader unit 6, the image of the document P is read in synchronism with a detection timing of the document P by the timing sensor S3.

Next, the arrangement of the switchback section 42 is described.

The switchback section 42 extends upward from the U-shape transport section 41. The switchback section 42 is adapted for guiding the document P therein from the U-shape transport section 41 for a switchback operation and returning the document P to the U-shape transport section 41 to turn the side of the document P for image reading outward of the first to fifth transport routes 411 to 415, namely, opposite to the image reader unit 6.

The switchback section 42 includes a sixth transport route 421, a seventh transport route 422, an eighth transport route 423, an inverting switch lever 51, an inverting sensor S4, a transport direction regulating plate 53, an inverting roller 424 and an inverting driven roller 425.

The sixth transport route 421 intersects the second transport route 412 at a base end (entrance) thereof and extends obliquely upward therefrom to join the seventh transport route 422. The eighth transport route 423 intersects a junction between the sixth transport route 421 and the seventh transport route 422, extends obliquely downward therefrom, and joins the exit of the second transport route 412 connected to the third transport route 413.

The seventh transport route 422 is curved toward the document setting portion 2 from the junction between the sixth transport route 421 and the eighth transport route 423 and further extends substantially horizontally toward a certain position above the document setting portion 2. The seventh transport route 422 is adapted for temporarily retracting the document P transported along the U-shape transport section 41 via the sixth transport route 421, inverts the transport direction therealong, and returns the document P to the U-shape transport section 41 via the eighth transport route 423. The seventh transport route 422 is hereinafter also referred to as "switchback route 422".

A switchback cover 49 (or cover 49) for covering an upper portion of the switchback route 422 is provided on the main body of the ADF 1. The cover 49 prevents the document P coming into the switchback route 422 for a switchback operation from interfering with an obstacle, such as a book, that is left at the upper portion of the ADF 1. Provision of the cover 49 ensures the switchback operation without the possibility of such interference. The cover 49 substantially extends from the junction of the main transport route 41 and the switchback section 42 up to the certain position above the document setting portion 2 to define the invert access port 102 together with the switchback route 422 to guidingly discharge the lead end of the document P in the entering direction into the switchback route 422 for the switchback operation onto the document setting portion 2.

Figure 12:
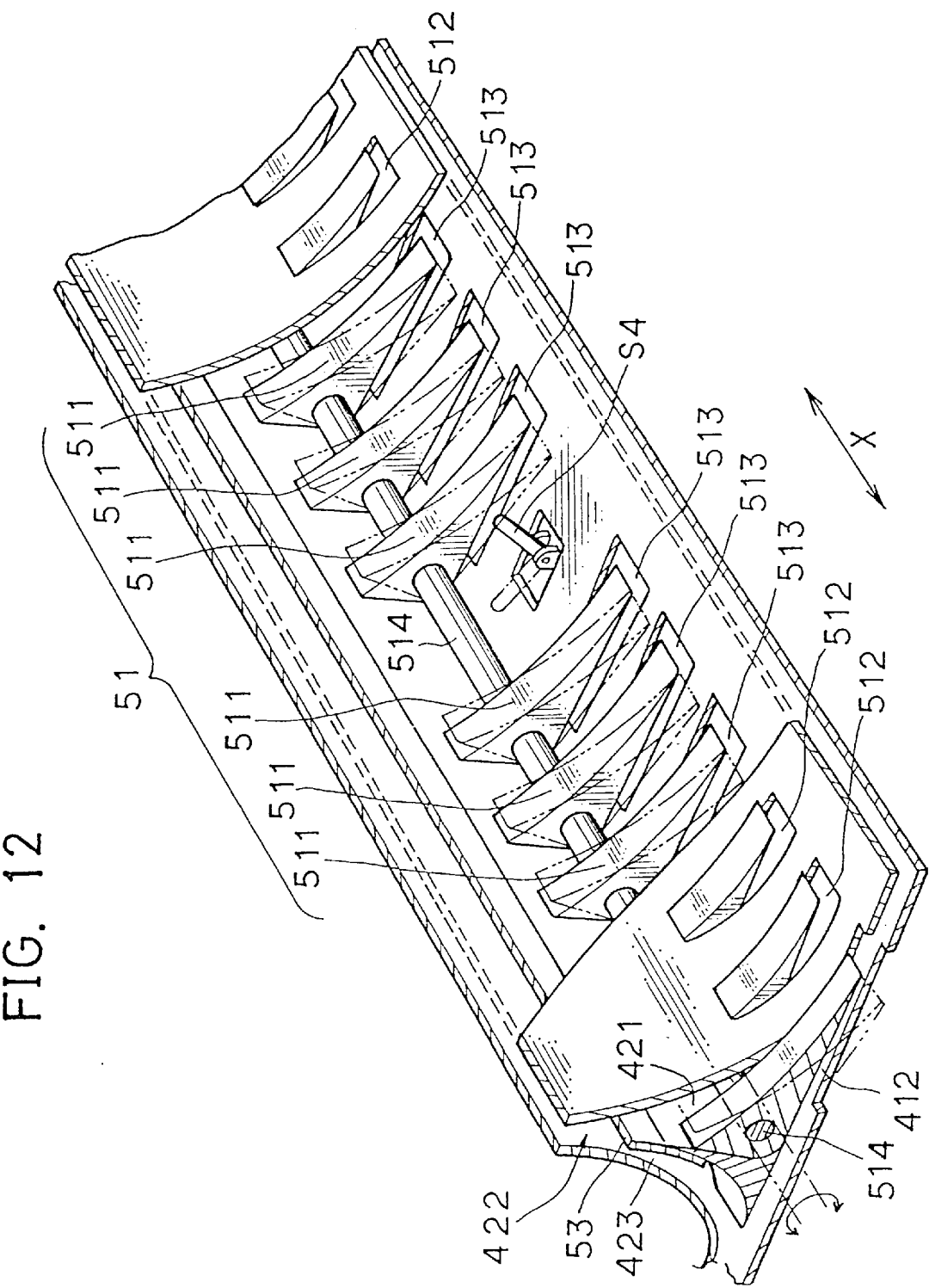
FIG. 12 is a partially cross-sectional perspective view showing a junction area between a U-shape transport section (main transport route) and a switchback section.

As shown in FIG. 12, the inverting switch lever 51 is provided at the junction between the second transport route 412 and the sixth transport route 421 to selectively guide the document P transported along the first transport route 411 to the second transport route 412 and the sixth transport route 421. The inverting switch lever 51 is constructed, as shown in FIG. 12, such that a plurality of ribs 511 are formed at a certain interval in an axial direction of a lever shaft 514. Rotating the lever shaft 514 in a certain direction by an unillustrated inverting solenoid changeably sets the position of the ribs 511 between the solid-line position (invert non-activating position) and the imaginary-line position (invert activating position).

Specifically, when the ribs 511 are set at the solid-line position, respective lead ends of the ribs 511 are fitted into recesses 512 formed in the junction area between the second transport route 412 and the sixth transport route 421 (specifically in a lower wall constituting the sixth transport route 421) to thereby guide the document P to the second transport route 412. On the other hand, when the ribs 511 are set at the imaginary-line position, the respective lead ends of the ribs 511 are fitted in recesses 513 formed in the junction area (specifically, in an upper wall constituting the second transport route 412) to thereby guide the document P to the sixth transport route 421.

The ribs 511 of the inverting switch lever 51 at a substantially intermediate portion in the axial direction (X direction) of the lever shaft 514 are disposed at a relatively wide interval. A detecting piece of the inverting sensor S4 (junction sensor S4) projects upward through an opening formed in the intermediate portion of the junction area. Specifically, the height level of the detecting piece of the inverting sensor S4 substantially coincides with the height level of the ribs 511 of the inverting switch lever 51 with respect to the width direction of the document P (X direction). With this arrangement, when the document P is transported to the junction area from the first transport route 411, the detecting piece of the inverting switch lever 51 is set to the imaginary-line position in FIG. 12 without interference with of the ribs 511. Then, the inverting sensor S4 detects that the document P is coming into the sixth transport route 421 for a switchback operation. The detection of the document P by the inverting sensor S4 combined with the position of the inverting switch lever 51 is described below in detail.

In this embodiment, the junction sensor S4 (inverting sensor S4) provided in the junction area between the second transport route 412 and the sixth transport route 421 functions as a sensor for detecting that the document P is being transported to the second transport route 412 and a sensor for detecting that the document P is being transported to the sixth transport route 421. Accordingly, the number of sensors is reduced to simplify the arrangement of the device, reduce the size of the device, and lower the production cost of the device including parts cost.

In this embodiment, the junction sensor S4 consists of a contact-type sensor. Alternatively, any known sensor, e. g., a non-contact type sensor such as a photosensor can be used as the sensors S1 to S4.

The transport direction regulating plate 53 is formed of a synthetic resin having elasticity, and is so constructed as to transport the document P in and out of the seventh transport route 422 (switchback route 422) without difficulty.

Specifically, the transport direction regulating plate 53 is provided at the junction joining the sixth transport route 421, the seventh transport route 422 and the eighth transport route 423 with such a shape that the width thereof in the X direction decreases toward the exit of the sixth transport route 421 connected to the seventh transport route 422 and increases toward the entrance of the eighth transport route 423 from the seventh transport route 422. In this way, since the transport direction regulating plate 53 has such a shape as to widen the width of the entrance of the eighth transport route 423, the document P is securely guided from the sixth transport route 421 into the seventh transport route 422 and exits out of the seventh transport route 422 into the eighth transport route 423.

Referring back to FIG. 1, the inverting roller 424 and the inverting driven roller 425 are disposed at the entrance of the switchback route 422, namely at the junction connecting the sixth transport route 421, the switchback route 422, and the eighth transport route 423. The inverting roller pair 424, 425 are adapted for guiding the document P into the switchback route 422 from the U-shape transport section 41 via the sixth transport route 421, and returning the document P from the switchback route 422 into the U-shape transport section 41 via the eighth transport route 423, thereby constructing a switchback mechanism for performing a switchback operation of the document P.

Specifically, the inverting roller 424 is driven by direct transmission of the rotating force of the feed motor without the feed clutch. With this arrangement, when the rotating direction of the inverting roller 424 is reversed, the transport direction of the document P is inverted.

The inverting driven roller 425 is switchingly settable at the imaginary-line position in FIG. 1 (pressing contact position) where the driven roller 425 is rendered into pressing contact with the inverting roller 424 and the solid-line position in FIG. 1 (release position) where the driven roller 425 is set away from the inverting roller 424 with a certain clearance by driving an unillustrated pressing solenoid.

When the driven roller 425 is set at the pressing contact position, the inverting roller pair 424, 425 are enabled to nip the document P to transport the document P downstream followed by rotation of the inverting roller 424. On the other hand, when the driven roller 425 is set at the release position, the nipped state of the document P is released. As a result, a skew correction of the document P during the switchback operation, which is described below, is enabled. Further, even when the switchback operation is performed for a document with the longer side thereof transported in the transport direction, the tail end of the document exiting out of the switchback route 422 and the lead end of a next document coming into the switchback route 422 can pass through the inverting roller pair 424, 425 in an overlapped manner.

In this embodiment, the switchback route 422 is provided above the U-shape transport section 41. Accordingly, the upper space of the ADF 1 is used as a space for temporarily holding the document P for switchback operation. Thereby, production of the device 1 of a smaller size is enabled.

The feedback section 43 is adapted for returning the document P after one side image reading to the junction between the first transport route 411 and the second transport route 412 via the fifth transport route 415 of the U shape transport section 41 for DS image reading, and includes a ninth transport route 431 and a discharge switch lever 52.

The ninth transport route 431 intersects at a certain position of the fifth transport route 415, extends upward in a curved shape from the intersecting position and joins the junction of the first transport route 411 and the second transport route 412.

The discharge switch lever 52 is provided at the junction between the fifth transport route 415 and the ninth transport route 431, and is selectively set at the solid-line position in FIG. 1 (feedback non-activating position) to open the transport route for the document P toward the discharge roller pair 420 and the imaginary-line position in FIG. 1 (feedback activating position) to open the transport route toward the ninth transport route 431 by activating an unillustrated discharge solenoid.

Next, a control system of the ADF 1 is described.

Figure 13:
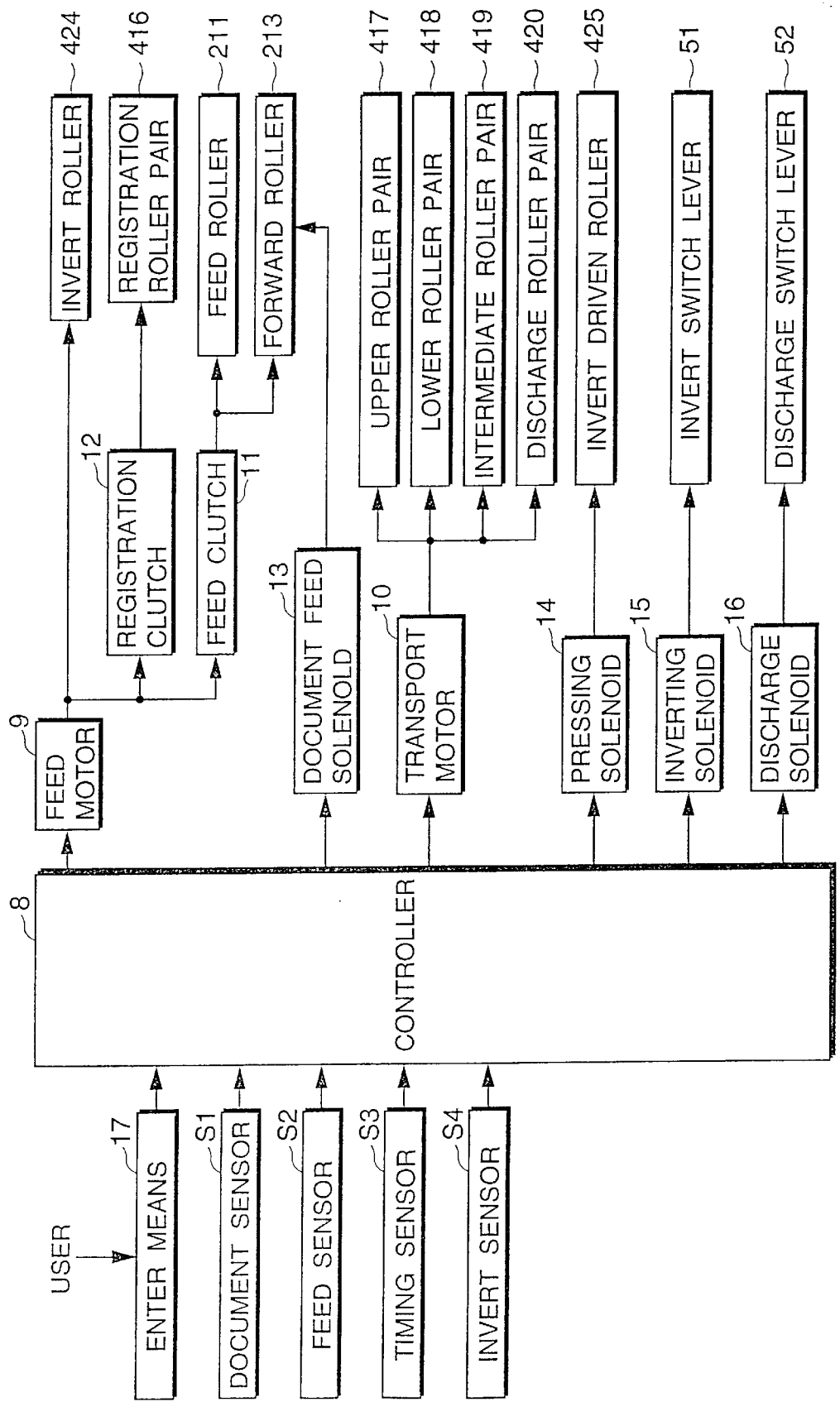
FIG. 13 is a block diagram of a control system as an embodiment in the automatic document feeder.

FIG. 13 is a block diagram showing an embodiment of the control system of the automatic document feeder 1. In FIG. 13, elements of the control system corresponding to the parts shown in FIG. 1 are denoted at the same reference numerals.

A controller 8 centrally controls a document transport operation for reading an image of the document P, and includes, e.g., a microcomputer. The controller 8 controls operations of various drive elements such as the feed motor 9, the transport motor 10, the feed clutch 11, the registration clutch 12, the sheet feed solenoid 13, the pressing solenoid 14, the inverting solenoid 15, and the discharge solenoid 16 based on designation from a user inputted through entry means 17 such as a switch and ten keys provided on an unillustrated operation panel and detection signals from various sensors such as the document sensor S1, the feed sensor S2, the timing sensor S3, and the inverting sensor S4.

The feed motor 9 is a drive source for driving the feed roller 211, the forward roller 213, the registration roller pair 416, and the inverting roller 424. Specifically, the feed motor 9 is a drive source for performing a switchback operation of the document P transported into the switchback route 422 as well as a drive source for feeding the document P stacked on the document setting portion 2 inside the main body of the ADF1 toward the first transport route 411.

The feed clutch 11 includes a one-way clutch which is turned on and off to transmit rotating drive force of the feed motor 9 to the feed roller 211 and the forward roller 213. The feed clutch 11 is controlled to turn on while the feed motor 9 rotates in the forward direction, which is described below. With this arrangement, the feed roller 211 and the forward roller 213 rotate in the forward direction by the operation of the feed clutch 11.

The registration clutch 12 also includes a one-way clutch to transmit rotating drive force of the feed motor 9 to the registration roller pair 416. The registration clutch 12 is controlled to turn off while the feed motor 9 rotates in the reverse direction, which is described below. With this arrangement, the registration roller 416 rotates in the reverse direction by the operation of the feed clutch 11.

The inverting roller 424 is driven by direct transmission of the rotating drive force of the feed motor 9 without a clutch or its equivalent. Accordingly, the inverting roller 424 is driven in the forward/reverse direction followed by the forward/reverse rotation of the feed motor 9.

The transport motor 11 is a drive source for driving the upper transport roller pair 417, the lower transport roller pair 418, the intermediate roller pair 419, and the discharge roller pair 420. The upper transport roller pair 417, the lower transport roller pair 418, the intermediate roller pair 419, and the discharge roller pair 420 are driven by direct transmission of the rotating drive force of the transport motor 10 without a clutch or its equivalent. The transport motor 10 is controlled to rotate in a predetermined direction. Accordingly, the upper transport roller pair 417, the lower transport roller pair 418, the intermediate roller pair 419, and the discharge roller pair 420 either suspend its rotation or rotate in the predetermined direction.

The sheet feed solenoid 13 is a switch member for switching the position of the forward roller 213 between the upper position and the lower position (contact position). When the sheet feed solenoid 13 is, e.g., turned ON, the forward roller 213 is set at the lower position, whereas when the sheet feed solenoid 13 is turned OFF, the forward roller 213 is set at the upper position.

The pressing solenoid 14 is a switch member for switching the position of the inverting driven roller 425 between the pressing contact position and the release position. When the pressing solenoid 14 is, e.g., turned ON, the driven roller 425 is set at the pressing contact position, whereas when the pressing solenoid 14 is turned OFF, the driven roller 425 is set at the release position.

The inverting solenoid 15 is a switch member for switching the position of the inverting switch lever 51 between the invert activating position and the invert non-activating position. When the inverting solenoid 15 is, e.g., turned ON, the inverting switch lever 51 is set at the invert activating position to open the transport route from the first transport route 411 to the sixth transport route 421 (i.e., close the transport route to the second transport route 412). On the other hand, when the inverting solenoid 15 is, e.g., turned OFF, the inverting switch lever 51 is set at the invert non-activating position to close the transport route from the first transport route 411 to the sixth transport route 421 (i.e., open the transport route to the second transport route 412).

The discharge solenoid 16 is a switch member for switching the position of the discharge switch lever 52 between the feedback activating position and the feedback non-activating position. When the discharge solenoid 16 is, e.g., turned ON, the discharge switch lever 52 is set at the feedback activating position to open the transport route from the fifth transport route 415 to the feedback section 43 (ninth transport route 431) (namely, close the transport route toward the discharge roller pair 420). On the other hand, when the discharge solenoid 16 is turned OFF, the discharge switch lever 52 is set at the feedback non-activating position to close the transport route to the feedback section 43 (namely, open the transport route toward the discharge roller pair 420).

The controller 8 stores data concerning switching of the position of the inverting switch lever 51 by the inverting solenoid 15. Specifically, when the inverting sensor S4 detects the presence of the document P while the inverting switch lever 51 is set at the invert activating position to open the transport route for the sixth transport route 421, the detection result by the sensor S4 indicates that the document P is being transported along the sixth transport route 421. On the other hand, when the inverting sensor S4 detects the presence of the document P while the inverting switch lever 51 is set at the invert non-activating position to open the transport route for the second transport route 412, the detection result by the sensor S4 indicates that the document P is being transported along the second transport route 412. In other words, the controller 8 constitutes a detection mechanism that detects the location of the document P as to whether the document P is transported along the sixth transport route 421 or the second transport route 412 based on the data concerning the position of the inverting switch lever 51.

Figure 14:
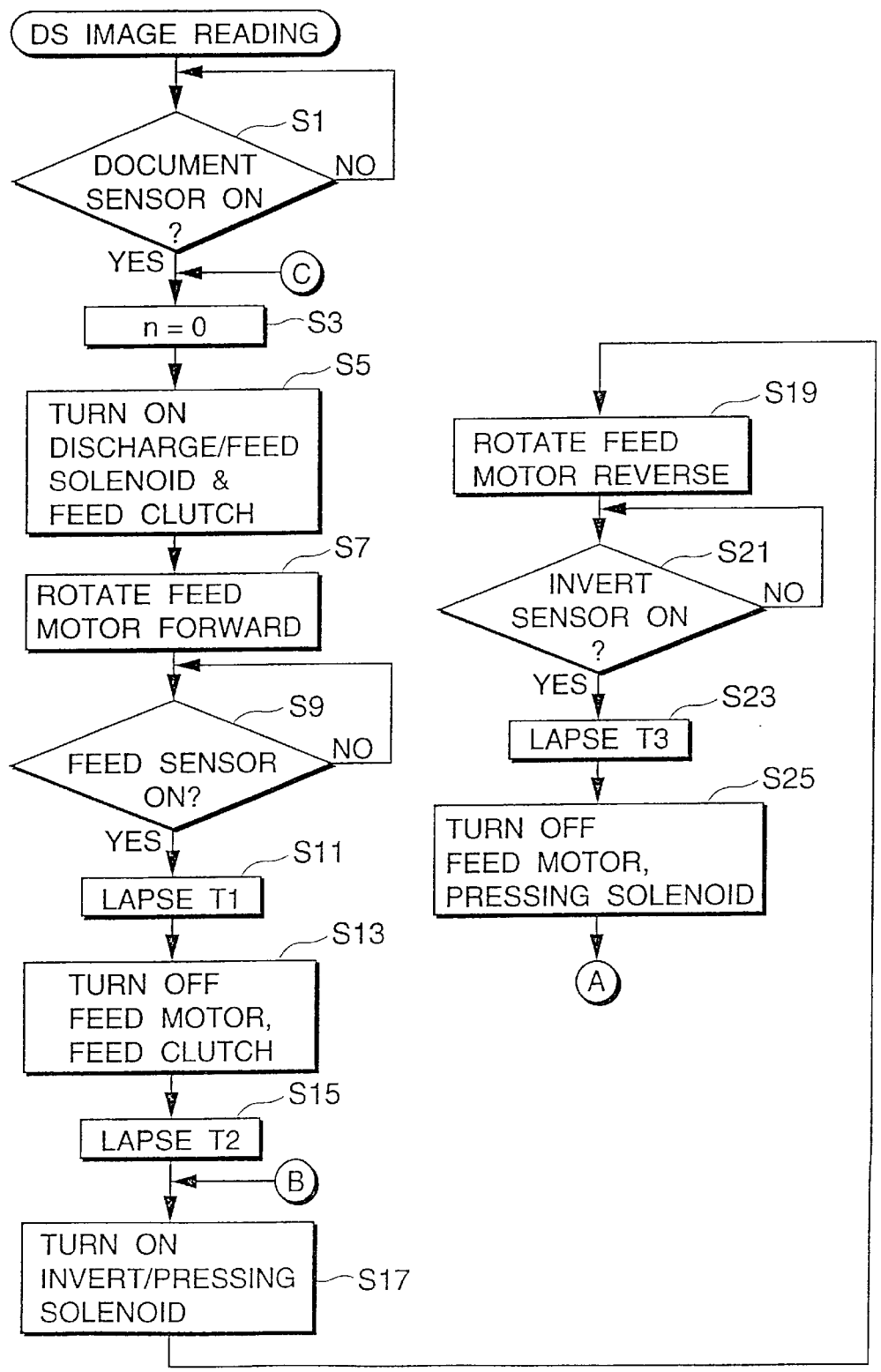
FIGS. 14 and 15 are diagrams showing a sequence of a document transport control by the automatic document feeder for double side image reading.
Figure 15:
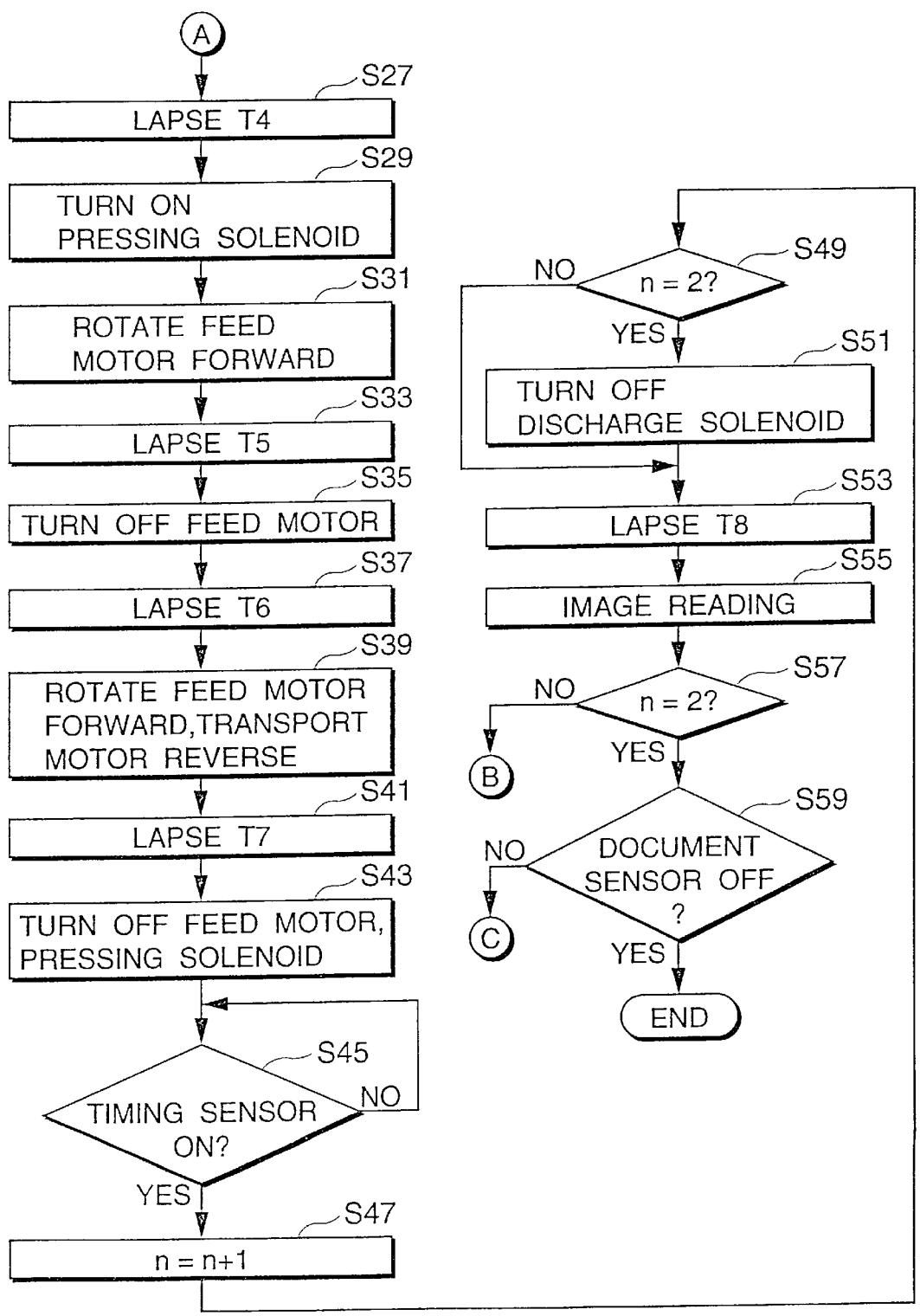

Next, a document transport sequence of the ADF 1 is described with reference to FIGS. 14 and 15 when the ADF 1 is operated to transport the document P for DS image reading.

When the document sensor S1 detects that the document P is set on the document setting portion 2 (YES in Step S1), the count value n indicating the number of document transport is set at "0" (in Step S3), and the feed clutch 11, the sheet feed solenoid 13, and the discharge solenoid 15 are turned ON (in Step S5). Then, the feedback section 43 is connected to the U-shape transport section 41, the forward roller 213 is set at the lower position to be rendered into contact with the document P, and the drive force of the feed motor 9 is transmitted to the feed roller 211 and the forward roller 213.

Subsequently, the feed motor 9 rotates in the forward direction to initiate feeding of the uppermost document P of the document on the document setting portion 2 toward the document transport unit 4 (in Step S7). When the feed sensor S2 detects that the document P is transported to the document transport unit 4 (YES in Step S9), the feed motor 9 suspends its rotation upon lapse of a predetermined time T1 from the detection of the feed sensor S2, and the feed clutch 11 is turned OFF (in Steps S11, S13). The predetermined time T1 is a time duration necessary for temporarily forming a non-flat portion of the document P around the lead end thereof required for correcting a skew transport of the document P from a timing when the lead end of the document P is nipped by the registration roller pair 416.

Transport of the document P is suspended for a predetermined time T2 from the operation in Step S13 in a state that the lead end of the document P is kept in a nipped state by the registration roller pair 416 (in Step S15). The predetermined time T2 is a time duration required for the registration roller pair 416 to securely hold nipping of the lead end of the document P to initiate a skew feed correction of the document P.

Subsequently, upon lapse of the predetermined time T2, the pressing solenoid 14 and the inverting solenoid 15 are turned ON (in Step S17). At this time, the U-shape transport section 41 is connected to the switchback section 42, and the inverting driven roller 425 is pressed against the inverting roller 424. Then, the feed motor 9 rotates in the reverse direction (in Step S19) to restart transport of the document P by the registration roller pair 416. In this way, the document P having passed the registration roller pair 416 is transported to the switchback section 42 via the sixth transport route 421 by the inverting switch lever 51.

Next, when the inverting sensor S4 detects that the document P is transported to the sixth transport route 421 (YES in Step S21), the feed motor 9 is turned ON upon lapse of a predetermined time T3 from the detection timing of the document P by the inverting sensor S4, and the pressing solenoid 14 is turned ON (in Steps S23, S25). The predetermined time T3 is a time duration necessary for the document P to be transported to the switchback route 422 by the inverting roller pair 424, 425 until a certain position of a tail end of the document P in the entering direction into the switchback route 422 for a switchback operation is nipped by the inverting roller pair 424, 425.

Figure 16A:
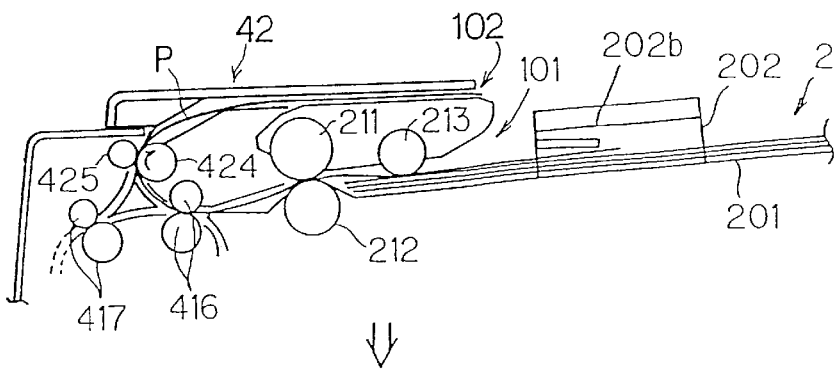
FIGS. 16A to 16C are diagrams showing a manner of transporting a document in the switchback section for a switchback operation.
Figure 16B:
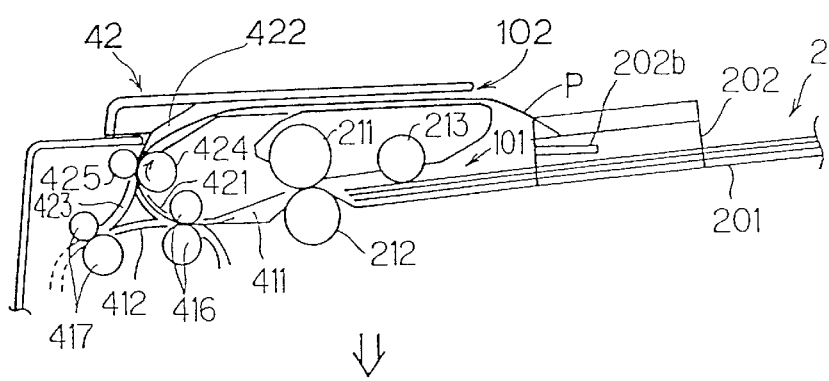
Figure 16C:
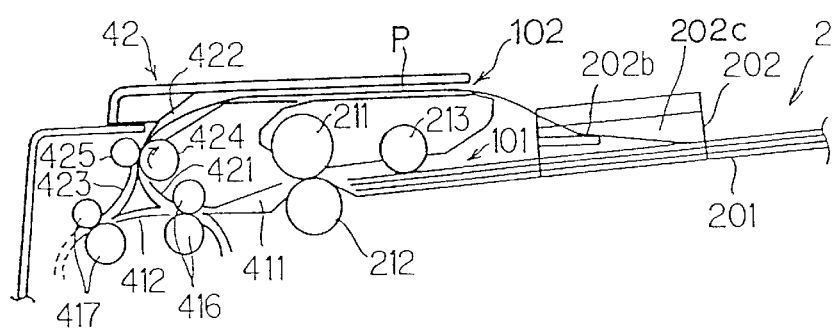
Figure 17:
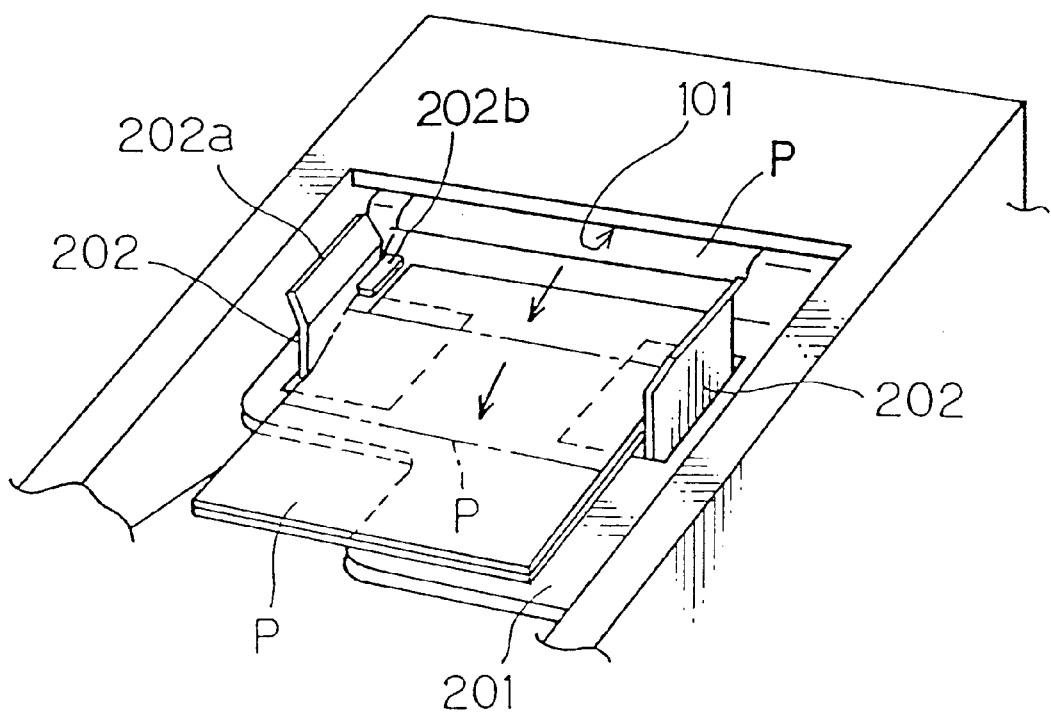
FIG. 17 is a perspective view of essential parts of the document setting portion when a document during a switchback operation is temporarily discharged above the remaining set of documents on the document setting portion.
Figure 18:
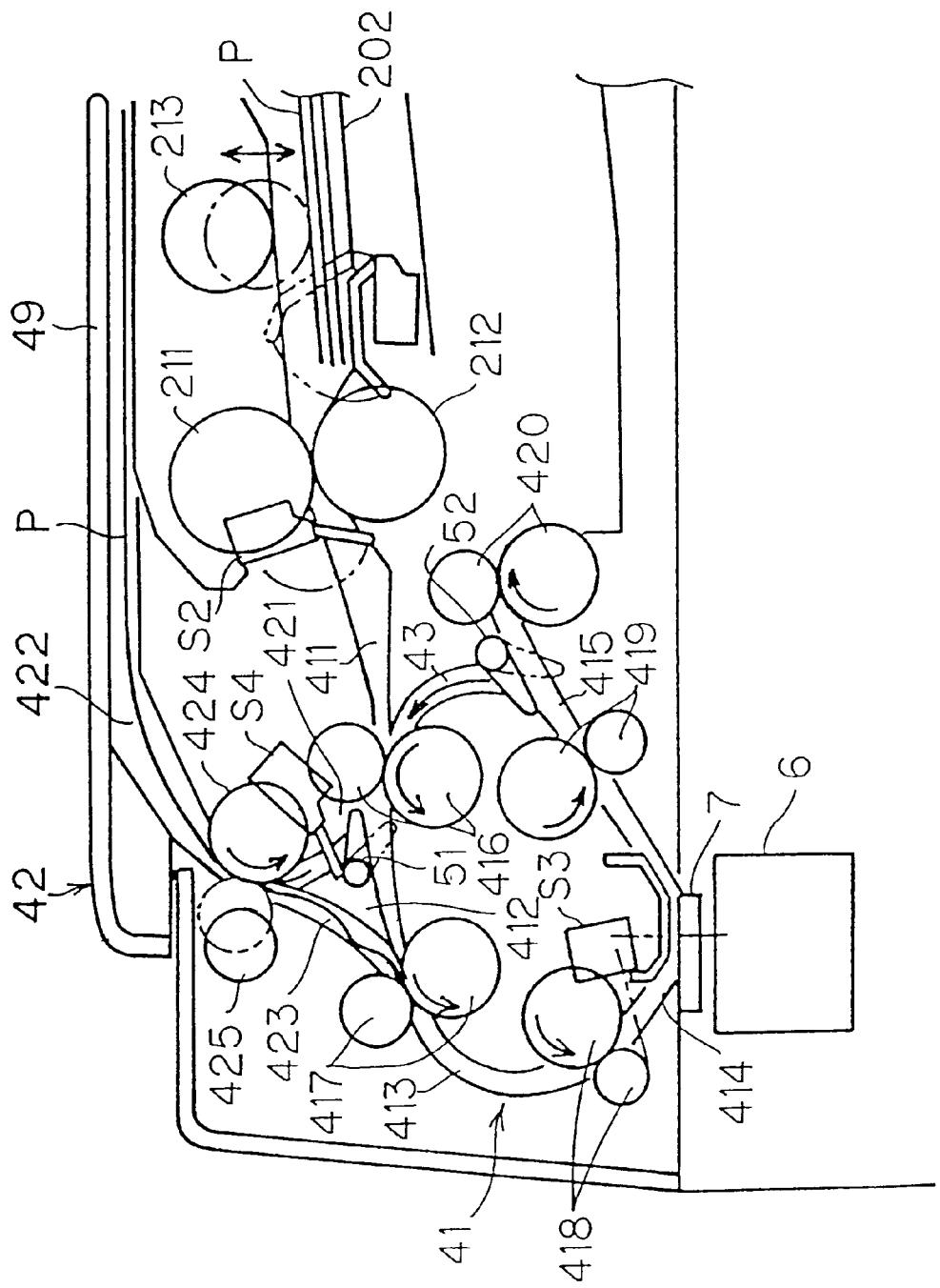
FIG. 18 is a diagram showing a state that a lead end of a document in the exiting direction out of the switchback section after a switchback operation is nipped by an upper transport roller pair.

FIGS. 16A to 17 are diagrams showing a manner as to how the document P is transported into the switchback route 422. As shown in FIGS. 16A to 16C, the lead end of the document P in the entering direction into the switchback route 422 for a switchback operation is temporarily discharged onto the document setting portion 2 through the invert access port 102 formed at the exit of the switchback route 422. At this time, as shown in FIG. 17, the lead end of the document P is securely guided inward of the document guides 202 while guided by the tapered portions 202a of the document guides 202.

At this time, the lead end of the document P is securely guided on the projecting pieces 202b formed on the inner surface of the document guides 202. Thereby, prevented is a possibility that the lead end of the document P is intruded inside the main body of the ADF1 through the document feed-in port 101 of the document setting portion 2 and that the switchback operation of the document P is interfered by the remaining set of documents stacked on the document tray 201.

At the timing when the tail end of the document P in the entering direction into the switchback route 422 reaches a certain position before the inverting roller pair 424, 425, the pressing contact of the driven roller 425 against the inverting roller 424 is released. Then, nipping of the tail end of the document P by the inverting roller pair 424, 425 is released in a state that the lead end thereof is freely guided inward of the document guides 202. Thus, the document P is rendered in a free state on the document tray 201. Accordingly, even if the lead end of the document P is temporarily discharged in a skew transport state through the document discharge port 102 (invert access port 102) onto the document setting portion 2, the pair of document guides 202 correct the skew transport state by guiding the lead end of the document P inward along the tapered portions 202a. As the lead end of the document P being guided along the tapered portions 202a, and eventually guided within a pair of vertical portions 202c that have substantially the same width as the width of the document P, a skew, if any in the lateral direction, of the document P in its entiety will be securely corrected because the tail end of the document P is not held between the inverted roller pair 424, 423.

The pair of document guides 202 also function as a skew feed-in preventing member by guiding the tail end of the document P when the document P is fed into the switchback section 42 through the invert access port 102.

Referring back to FIGS. 14 and 15, when the pressing solenoid 14 is turned ON after lapse of a predetermined time T4 after correcting the skew transport of the document P coming into the switchback route 422, the inverting driven roller 425 is pressed against the inverting roller 424 again (in Steps S27, S29). Then, the feed motor 9 starts rotating in the forward direction to start feeding the document P temporarily staying in the switchback route 422 in such a direction as to return the document P out of the switchback route 422 toward the main transport route 41. In this way, the switchback operation of the document P is terminated.

Subsequently, when a predetermined time T5 lapses from start of the forward rotation of the feed motor 9, the feed motor 9 temporarily suspends its rotation (in Steps S33, S35). The rotation suspend state of the feed motor 9 continues for a predetermined time T6 from the motor rotation suspend timing in Step S35 (in Step S37).

Driving of the feed motor 9 is temporarily suspended to function the upper transport roller pair 417 as a registration roller pair. Specifically, even if the skew transport of the document P is corrected by the registration roller pair 416, there still remains a possibility that a skew transport of the document P occurs during the switchback operation or the skew transport is not completely corrected. Using the upper transport roller pair 417 as the registration roller pair at the junction between the switchback section 42 and the U-shape transport section 41 to correct the skew transport of the document P after the switchback operation eliminates such drawback.

It should be noted that hereinafter "use something as a registration roller" is meant to be the following unless otherwise indicated clearly:

Assuming the registration roller is provided in a manner it extends in a direction orthogonal to the transport direction of the document. When the lead end of the document P being transported, thus having an inertia, makes contact with the registration roller oriented in orthogonal to the transport direction, then if there exists skew in the transported document P, say a lead end portion of the document is not exactly orthogonal to the transport direction, the orientation of the document P is corrected such that the lead end of the document P is aligned parallel with the registration roller due to the contact. Thus when we say "using something as a registration roller" in this specification that is meant to, unless otherwise indicated, be correcting the skew of the document with using a contact inertia of the document and an orientation of the registration with respect to the transport direction.

In order to perform a skew correction after the switchback operation, the predetermined time T5 is set to a time duration required for the document P to form a non-flat portion (redundant portion) around the lead end of the document in the exiting direction from the switchback section 42 after the switchback operation sufficient for performing a skew correction after the lead end comes to a space between the upper transport roller pair 417. The predetermined time T6 is a time duration necessary for securely nipping the lead end of the document P to enable a skew correction of the document P.

In this embodiment, the upper transport roller pair 417 for transporting the document P along the U-shape transport section 41 is used as the registration roller pair for correcting a skew transport of the document P after a switchback operation. Alternatively, a registration roller pair for correcting a skew transport of the document P after a switchback operation may be provided on the switchback route (seventh transport route) 422. However, using the upper transport roller pair 417 as the registration roller pair for correcting a skew transport of the document P after a switchback operation, as mentioned in the embodiment, simplifies the construction of the device and reduces the size of the device.

When the predetermined time T6 lapses from suspending of the rotation of the feed motor 9, and the skew correction by the upper transport roller pair 317 is completed, the feed motor 9 starts rotating in the forward direction and simultaneously, the transport motor 10 starts rotating in the reverse direction (in Step S39). Thereby, the document P starts to be transported by the inverting roller pair 424, 425 and the upper transport roller pair 417.

Subsequently, upon lapse of a predetermined time T7 (in Step S41), the pressing solenoid 14 is turned OFF, and the pressing contact of the inverting driven roller 425 against the inverting roller 424 is released. Then, the feed motor 9 is turned OFF, transmission of the drive force thereof to the inverting roller pair 424,425 is suspended, and the driving of the driven roller 424 is suspended (in Step S43). The predetermined time T7 is a time duration necessary for securely nipping the lead end of the document P by the upper transport roller pair 417 or the lower transport roller pair 418.

In this way, the document P is transported by the upper transport roller pair 417, and the inverting roller pair 424, 425 until the predetermined time T7 lapses after a skew correction by the upper transport roller pair 417 for the following reason. When the pressing contact of the inverting driven roller 425 against the inverting roller 424 is released when the lead end of the document P comes to a space between the upper transport roller pair 417, the document P is transported solely by the driving force of the upper transport roller pair 417 in a state that the tail end thereof is left free. Accordingly, there rises a possibility that a skew transport occurs, which deteriorates the skew correction performance of the ADF 1 as a whole. In this embodiment, however, the skew correction performance of the ADF 1 is secured by transporting the document P by the upper transport roller pair 417 and the inverting roller pair 424, 425 by a certain distance corresponding to the predetermined time T after the skew correction by the upper transport roller pair 417.

After Step S43, when the document P is transported to the image reading position P3 by the upper transport roller pair 417, the lower transport roller pair 418, and the intermediate roller pair 419, and the timing sensor S3 detects the lead end of the document P (YES in Step S45), the count value n indicating the number of document transport is incremented by 1 (in Step S47). Then, it is judged whether the count value n is set at "2" (in Step S49).

When it is judged that n=2 (YES in Step S49), the discharge solenoid 16 is turned OFF (in Step S51) to discharge the document P after the image reading since the judgement result indicates that the document transport has been performed twice (i.e., the document transport this time is for reading the image on one side of the document P). Then, the feedback section 43 is isolated from the U-shape transport section 41.

On the other hand, when n<2 (NO in Step S49), Step S51 is skipped to return the document P after the image reading to the switchback section 42 since the document transport this time is for reading the image on the opposite side of the document P, and the discharge solenoid 16 is kept in an ON-state.

Subsequently, the image reader unit 6 starts reading the image on the opposite side of the document P at a timing upon lapse of a predetermined time T8 based on a detection signal from the timing sensor S3 (in Steps S53, S55).

In this way, when the image reading of the document P is finished, it is judged whether the count value n equals to "2" (in Step S57). If it is judged that n<2 (NO in Step S57), the sequence returns to Step S17 to return the document P to the switchback section 42 via the feedback section 43 so as to read the image on one side of the document P. On the other hand, when it is judged that n=2 (YES in Step S57), then it is judged whether there remains a document P on the document setting portion 2 since the judgement result indicates that both side image reading of the document P is finished and the document P is discharged onto the document discharge portion 3 (in Step S59). If it is judged that there remains a document P on the document setting portion 2 (NO in Step S59), this sequence returns to Step S3 to perform DS image reading of the next document P.

If it is judged that no document is left on the document setting portion 2 (YES in Step S59), DS image reading of all the documents stacked on the document setting portion 2 is finished since the judgement result indicates that image reading of all the documents P is completed.

It should be noted that in the foregoing description, there are basically two types of skew transport correctors: one is a pair of guide plates 202 each having a tapered portion 202a (a first skew corrector) and the other one is a registration roller pair (such as 417) using an inertia of document P when it makes contact with the roller pair (a second skew corrector). In addition, the roller pair is also referred to as a skew correcting means. The first skew corrector makes contact with the side of the document P and the second skew corrector makes contact with the lead end of the document P to correct skew transport of the document P. Thus the reader should not be confused with the term "skew corrector" as this term per see contains two types.

The sheet transport device (document feeder) according to this invention has been described for the case where the document feeder is incorporated in a copier. This invention is not limited to the above embodiment and applicable to, e.g., an image forming apparatus for transporting a copy sheet to form an image on the copy sheet. In other words, this invention is applicable to any type of sheet transport device as long as the sheet transport device has a mechanism for transporting a sheet such as a document and a copy sheet along a predetermined transport route and the transport route is branched into plural paths at respective junctions.

In the foregoing embodiment, described was the document feeder of upto-down-feed-in type in which a set of documents are stacked on the document setting portion in a state that one side of the document faces upward and the documents are successively fed from the uppermost one. Alternatively, this invention is applied to any type of document feeder regardless of the increasing manner of the page number of the document set placed on the document setting portion (upward-increasing or downward-increasing) and feed-in order of document (up-to-down-feed-in system or down-to-up-feed-in system).

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A sheet transport device comprising:

a sheet setting portion for accepting a sheet at a set position at an feed-in port;

a main transport route for transporting the sheet in a sheet transport direction from the sheet setting portion via said feed-in port to one of an image reading position and an image forming position, said main transport route including a main transport route transport mechanism for transporting the sheet along the main transport route;

sheet guides disposed on the sheet setting portion positioned to contact lateral opposing edges of the sheet to align the sheet at said set position on the sheet setting portion to prevent the sheet having a skewed orientation relative to said sheet transport direction;

a switchback route, extending from an intersection with a junction portion along the main transport route, for receiving the sheet from the main transport route and guiding a lead end of the sheet into the pair of sheet guides and guiding the sheet back to the main transport route; and a switchback mechanism for transporting the sheet from the main transport route into and along the switchback route with the lead end preceding a tail end to a position whereat the lead end is between the sheet guides while the tail end is within the switchback mechanism and for returning the sheet into the main transport route with the tail end preceding the lead end thereby reversing a direction of travel of the sheet.

2. The sheet transport device as recited in claim 1, wherein each of the sheet guides includes a tapered portion opposing the tapered portion of another one of the sheet guides oriented such that a distance between the sheet guides at the tapered portions increases towards ends of the tapered portions to guide the lead end of the sheet from the switchback route between the pair of sheet guides.

3. The sheet transport device as recited in claim 1, wherein at least one of the sheet guides has a restricting piece for preventing the lead end of the sheet positioned between the sheet guides by the switchback mechanism from being disposed proximate said feed-in port of the sheet setting portion.

4. The sheet transport device as recited in claim 1, wherein the switchback mechanism includes:

an inverting roller provided along the switchback route and rotatable in a forward direction and a backward direction;

an inverting driven roller opposing said inverting roller; and a pressing actuator for engaging and disengaging said inverting roller and said inverting driven roller with one another to place said inverting roller and said inverting driven roller in a nipping state and a non-nipping state to effect selective nipping of the sheet.

5. The sheet transport device as recited in claim 4, further comprising a controller for controlling the pressing actuator to temporarily disengage the inverting driven roller from the inverting roller when a rotating direction of the inverting roller is reversed to effect return of the sheet to the main transport route.

6. The sheet transport device as recited in claim 4, further comprising a controller for controlling the pressing actuator to temporarily disengage the inverting driven roller from the inverting roller to un-nip the sheet when the lead end of the sheet is between the sheet guides to effect skew correction of the sheet by the sheet guides.

7. The sheet transport device as recited in claim 1, further comprising a cover that covers an area from said junction portion to position above the sheet setting portion to form an upper wall of the switchback route.

8. The sheet transport device as recited in claim 1, wherein the sheet-transport device is an automatic document feeder for transporting a set of documents successively to said image reading position to read an image on both sides of the document at the image reading position.

9. A sheet transport device comprising:

a sheet setting portion for accepting a sheet at a set position at an feed-in port;

a main transport route for transporting the sheet in a sheet transport direction from the sheet setting portion via said feed-in port to one of an image reading position and an image forming position, said main transport route including a main transport route transport mechanism for transporting the sheet along the main transport route;

sheet guides disposed on the sheet setting portion positioned to contact lateral opposing edges of the sheet to align the sheet at said set position on the sheet setting portion to prevent the sheet having a skewed orientation relative to said sheet transport direction;

a switchback route, extending from an intersection with a junction portion along the main transport route, for receiving the sheet from the main transport route and guiding a lead end of the sheet into the pair of sheet guides and guiding the sheet back to the main transport route;

a switchback mechanism for transporting the sheet from the main transport route into and along the switchback route with the lead end preceding a tail end and for returning the sheet into the main transport route with the tail end preceding the lead end thereby reversing a direction of travel of the sheet;

said main transport route having first and second transport plates opposing each other defining a guide path therebetween through which the sheet is guided, said first and second transport plates respectively defining first and second roller apertures; and said main transport route transport mechanism including:
  a drive roller accessing said guide path via said first aperture;
  a driven roller accessing said drive path via said second aperture; and
  the drive roller and driven roller being disposed to nip the sheet at a nip position substantially aligned with a surface of said second transport plate at said second roller aperture.

10. The sheet transport device as recited in claim 9, wherein said second roller aperture has a width along an axial direction of the driven roller that is set larger than a width of the driven roller in the axial direction so that part of the driven roller is allowed to project into the guide path through the opening.

11. The sheet transport device as recited in claim 9, wherein the second transport plate defines said second roller aperture to expose the driven roller inward of the guide path, and a lateral end of the second roller aperture in a rotating axial direction of the driven roller is formed into a tapered shape such that a width of said second roller aperture in the axial direction of the driven roller increases in a thickness direction of the second transport plate as directed inward toward the guide path.

12. The sheet transport device as recited in claim 9, wherein the second transport plate defines said second roller aperture to expose the driven roller inward of the guide path, and a lateral end of the second roller aperture in a rotating axial direction of the driven roller is formed into an arc shape such that a width of said second roller aperture in the axial direction of the driven roller increases in a thickness direction of the second transport plate as directed inward toward the guide path.

13. A sheet transport device comprising:
  a sheet setting portion for accepting a sheet at a set position at an feed-in port;
  a main transport route for transporting the sheet in a sheet transport direction from the sheet setting portion via said feed-in port to one of an image reading position and an image forming position, said main transport route including a main transport route transport mechanism for transporting the sheet along the main transport route;

sheet guides disposed on the sheet setting portion positioned to contact lateral opposing edges of the sheet to align the sheet at said set position on the sheet setting portion to prevent the sheet having a skewed orientation relative to said sheet transport direction;

a switchback route, extending from an intersection with a junction portion along the main transport route, for receiving the sheet from the main transport route and guiding a lead end of the sheet into the pair of sheet guides and guiding the sheet back to the main transport route;

a switchback mechanism for transporting the sheet from the main transport route into and along the switchback route with the lead end preceding a tail end and for returning the sheet into the main transport route with the tail end preceding the lead end thereby reversing a direction of travel of the sheet;

said main transport route having first and second transport plates opposing each other defining a guide path therebetween through which the sheet is guided, said first and second transport plates respectively defining first and second roller apertures; and said main transport route transport mechanism including:
    a drive roller accessing said guide path via said first aperture;
    a driven roller accessing said drive path via said second aperture; and
    the drive roller and driven roller being disposed to nip the sheet at a nip position substantially aligned with a surface of one of said first and second transport plates at a respective one of said first and second roller apertures.

14. The sheet transport device as recited in claim 13, wherein said respective one of said first and second roller apertures has a width along an axial direction of a corresponding one of said drive roller and said driven roller that is set larger than a width of said corresponding one of said drive roller and said driven roller in the axial direction so that part of said corresponding one of said drive roller and said driven roller is allowed to project into the guide path through the opening.

15. The sheet transport device as recited in claim 13, wherein said one of said first and second transport plates defines said respective one of said first and second roller apertures to expose a corresponding one of said drive roller and said driven roller inward of the guide path, and a lateral end of said respective one of said first and second roller apertures in a rotating axial direction of said corresponding one of said drive roller and said driven roller is formed into a tapered shape such that a width of said respective one of said first and second roller apertures in the axial direction of said corresponding one of said drive roller and said driven roller increases in a thickness direction of said one of said first and second transport plates as directed inward toward the guide path.

16. The sheet transport device as recited in claim 13, wherein said one of said first and second transport plates defines said respective one of said first and second roller apertures to expose a corresponding one of said drive roller and said driven roller inward of the guide path, and a lateral end of said respective one of said first and second roller apertures in a rotating axial direction of said corresponding one of said drive roller and said driven roller is formed into an arc shape such that a width of said respective one of said first and second roller apertures in the axial direction of said corresponding one of said drive roller and said driven roller increases in a thickness direction of said one of said first and second transport plates as directed inward toward the guide path.

17. A sheet transport device comprising:

a sheet setting portion for accepting a sheet at a set position at an feed-in port;

a main transport route for transporting the sheet in a sheet transport direction from the sheet setting portion via said feed-in port to one of an image reading position and an image forming position, said main transport route including a main transport route transport mechanism for transporting the sheet along the main transport route;

sheet guides disposed on the sheet setting portion positioned to contact lateral opposing edges of the sheet to align the sheet at said set position on the sheet setting portion to prevent the sheet having a skewed orientation relative to said sheet transport direction;

a switchback route, extending from an intersection with a junction portion along the main transport route, for receiving the sheet from the main transport route and guiding a lead end of the sheet into the pair of sheet guides and guiding the sheet back to the main transport route;

a switchback mechanism for transporting the sheet from the main transport route into and along the switchback route with the lead end preceding a tail end to a position whereat the lead end is between the sheet guides while the tail end is within the switchback mechanism and for returning the sheet into the main transport route with the tail end preceding the lead end thereby reversing a direction of travel of the sheet;

said switchback mechanism including:

an inverting roller provided along the switchback route and rotatable in a forward direction and a backward direction;

an inverting driven roller opposing said inverting roller; and a pressing actuator for engaging and disengaging said inverting roller and said inverting driven roller with one another to place said inverting roller and said inverting driven roller in a nipping state and a non-nipping state to effect selective nipping of the sheet; and a controller for controlling the pressing actuator to disengage the inverting driven roller from the inverting roller for a predetermined time period to un-nip the sheet when the lead end of the sheet is between the sheet guides to free the sheet and effect skew correction of the sheet by the sheet guides during said predetermined time period and for controlling the pressing actuator to re-nip the sheet at a termination of said predetermined time period.

18. The sheet transport device as recited in claim 17, wherein:

said main transport route has first and second transport plates opposing each other defining a guide path therebetween through which the sheet is guided, said first and second transport plates respectively defining first and second roller apertures; and said main transport route transport mechanism includes:

a drive roller accessing said guide path via said first aperture;

a driven roller accessing said drive path via said second aperture; and the drive roller and driven roller being disposed to nip the sheet at a nip position substantially aligned with a surface of one of said first and second transport plates at a respective one of said first and second roller apertures.

19. The sheet transport device as recited in claim 18, wherein said respective one of said first and second roller apertures has a width along an axial direction of a corresponding one of said drive roller and said driven roller that is set larger than a width of said corresponding one of said drive roller and said driven roller in the axial direction so that part of said corresponding one of said drive roller and said driven roller is allowed to project into the guide path through the opening.

20. The sheet transport device as recited in claim 19, wherein said one of said first and second transport plates defines said respective one of said first and second roller apertures to expose a corresponding one of said drive roller and said driven roller inward of the guide path, and a lateral end of said respective one of said first and second roller apertures in a rotating axial direction of said corresponding one of said drive roller and said driven roller is formed into a tapered shape such that a width of said respective one of said first and second roller apertures in the axial direction of said corresponding one of said drive roller and said driven roller increases in a thickness direction of said one of said first and second transport plates as directed inward toward the guide path.

21. The sheet transport device as recited in claim 19, wherein said one of said first and second transport plates defines said respective one of said first and second roller apertures to expose a corresponding one of said drive roller and said driven roller inward of the guide path, and a lateral end of said respective one of said first and second roller apertures in a rotating axial direction of said corresponding one of said drive roller and said driven roller is formed into an arc shape such that a width of said respective one of said first and second roller apertures in the axial direction of said corresponding one of said drive roller and said driven roller increases in a thickness direction of said one of said first and second transport plates as directed inward toward the guide path.

* * * * *